(12) United States Patent
Chung

(10) Patent No.: US 12,441,829 B2
(45) Date of Patent: Oct. 14, 2025

(54) FUNCTIONAL BOTTLEBRUSH POLYMERS

(71) Applicant: Florida State University Research Foundation, Inc., Tallahassee, FL (US)

(72) Inventor: Hoyong Chung, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 0 days.

(21) Appl. No.: 18/600,087

(22) Filed: Mar. 8, 2024

(65) Prior Publication Data

US 2024/0287235 A1  Aug. 29, 2024

Related U.S. Application Data

(62) Division of application No. 17/150,001, filed on Jan. 15, 2021, now Pat. No. 11,958,928, which is a
(Continued)

(51) Int. Cl.
*C08F 290/02* (2006.01)
*C08F 290/00* (2006.01)
(Continued)

(52) U.S. Cl.
CPC .......... *C08F 290/00* (2013.01); *C08F 290/02* (2013.01); *C08F 290/04* (2013.01); *C08F 290/06* (2013.01); *C08F 291/06* (2013.01); *C08F 291/12* (2013.01); *C08G 61/08* (2013.01); *C08G 65/33396* (2013.01); *C08G 65/3348* (2013.01); *C08G 65/336* (2013.01); *C08G 2261/131* (2013.01); *C08G 2261/132* (2013.01); *C08G 2261/135* (2013.01); *C08G 2261/136* (2013.01); *C08G 2261/1422* (2013.01); *C08G 2261/1424* (2013.01); *C08G 2261/1426* (2013.01); *C08G 2261/143* (2013.01);
(Continued)

(58) Field of Classification Search
CPC .... C08J 3/247–3/248; C08F 290/00–290/068; C08F 291/12
See application file for complete search history.

(56) References Cited

U.S. PATENT DOCUMENTS 5,312,940 A   5/1994  Grubbs et al.
6,313,332 B1  11/2001  Grubbs et al.
(Continued)

FOREIGN PATENT DOCUMENTS

WO   2010009938 A1   1/2010

OTHER PUBLICATIONS

Slegeris, Rimantas et al "Catechol and ketone containing multi-functional bottlebrush polymers for oxime ligation and hydrogel formation" Jul. 14, 2017, Polymer Chemistry 8, 4707-4715 (Year: 2017).*
(Continued)

*Primary Examiner* — Randy P Gulakowski
*Assistant Examiner* — David L Miller
(74) *Attorney, Agent, or Firm* — GrayRobinson, P.A.

(57) ABSTRACT

An example of a bottlebrush polymer has a polymer backbone and a plurality of individual brush moieties bonded to the polymer backbone. The individual brush moieties respectively include a crosslinked oxyamine moiety, a hydrophilic segment, and a surface adhesive terminal group.

16 Claims, 6 Drawing Sheets

Related U.S. Application Data division of application No. 15/963,623, filed on Apr. 26, 2018, now Pat. No. 10,894,854.

(60) Provisional application No. 62/492,388, filed on May 1, 2017.

(51) Int. Cl.

| | |
|---|---|
| *C08F 290/04* | (2006.01) |
| *C08F 290/06* | (2006.01) |
| *C08F 291/06* | (2006.01) |
| *C08F 291/12* | (2006.01) |
| *C08G 61/08* | (2006.01) |
| *C08G 65/333* | (2006.01) |
| *C08G 65/334* | (2006.01) |
| *C08G 65/336* | (2006.01) |
| *C08J 3/24* | (2006.01) |

(52) U.S. Cl.
CPC ........... *C08G 2261/1432* (2013.01); *C08G 2261/145* (2013.01); *C08G 2261/148* (2013.01); *C08G 2261/228* (2013.01); *C08G 2261/3324* (2013.01); *C08G 2261/364* (2013.01); *C08G 2261/40* (2013.01); *C08G 2261/72* (2013.01); *C08G 2261/75* (2013.01); *C08G 2261/76* (2013.01); *C08G 2261/78* (2013.01); *C08G 2650/02* (2013.01); *C08G 2650/20* (2013.01); *C08G 2650/32* (2013.01); *C08G 2650/34* (2013.01); *C08G 2650/44* (2013.01); *C08G 2650/50* (2013.01); *C08J 3/247* (2013.01); *C08J 2365/00* (2013.01); *C08J 2371/02* (2013.01)

(56) References Cited

U.S. PATENT DOCUMENTS

| | | | |
|---|---|---|---|
| 9,234,985 | B2 | 1/2016 | Grubbs et al. |
| 9,421,164 | B2 | 8/2016 | Chung et al. |

OTHER PUBLICATIONS

Adkins et al.; "High Relaxivity MRI Imaging Reagents from Bimodal Star Polymers"; The Royal Society of Chemistry, Polymer. Chemistry.; vol. 3, pp. 390-398; 2012.
Ashley et al.; "Hydrogel Drug Delivery System with Predictable and Tunable Drug Release and Degradation Rates"; PNAS; vol. 110, No. 6; pp. 2318-2323; Feb. 5, 2013.
Azagarsamy et al.; "Bioorthogonal Click Chemistry: an Indispensable Tool to Create Multifaceted Cell Culture Scaffolds"; American Chemical Society, ACS Macro Letters; vol. 2, pp. 5-9; 2013.
Bakaic et al.; Injectable Hydrogels Based on Poly(ethylene glycol) and Derivatives as Functional Biomaterials; Royal Society of Chemistry, RSC Advances; vol. 5, pp. 35469-35486; 2015.
Blum et al.; "Activating Peptides for Cellular Uptake via Polymerization into high density Brushes"; The Royal Society of Chemistry; vol. 7, pp. 989-994; 2016.
Burts et al.; "Using EPR to Compare PEG-Branch-Nitroxide "Bivalent-Brush Polymers" and Traditional PEG Bottle-Brush Polymers; Branching Makes a Difference"; American Chemical Society, Macromolecules; vol. 45, pp. 8310-8318; 2012.
Choo et al.; "Phase Behavior of Polylactide-Based Liquid Crystalline Brushlike Block Copolymers"; American Chemical Society, Macromolecules; vol. 48, pp. 8315-8322; 2015.
Chung et al.; "Rapidly Cross-Linkable DOPA Containing Terpolymer Adhesives and PEG-Based Cross-Linkers for Biomedical Applications"; American Chemical Society, Macromolecules; vol. 45, pp. 9666-9673; 2012.
Collins et al.; "The Emergence of Oxime Click Chemistry and its Utility in Polymer Science"; The Royal Society of Chemistry, Polymer Chemistry; vol. 7, pp. 3812-3826; 2016.
Czech, Z; "Crosslinking of Pressure Sensitive Adhesive Based on Water-Borne Acrylate"; Society of Chemical Industry, Polymer International; vol. 52, pp. 347-357; 2003.
Deshmukh et al.; "Interplay Between Liquid Crystalline Order and Microphase Segregation on the Self-Assembly of Side-Chain Liquid Crystalline Brush Block Copolymers"; American Chemical Society, Macromolecules; vol. 46, pp. 8245-8252; 2013.
Deshmukh et al.; "Molecular Design of Liquid Crystalline Brush-Like Block Copolymers for Magnetic Field Directed Self-Assembly: a Platform for Functional Materials"; American Chemical Society, ACS Macro Letters; vol. 3, pp. 462-466; 2014.
Fan et al.; "Cell Fouling Resistance of Polymer Brushes Grafted from Ti Substrates by Surface-Initiated Polymerization: Effect of Ethylene Glycol Side Chain Length"; American Chemical Society; Biomacromolecules; vol. 7, No. 8, pp. 2443-2448; 2006.
Faure et al.; "Catechols as Versatile Platforms in Polymer Chemistry"; Progress in Polymer Science; vol. 38; pp. 236-270; 2013.
Forooshani et al.; "Recent Approaches in Designing Bioadhesive Materials Inspired by Mussel Adhesive Protein"; Journal of Polymer Science, Polymer Chemistry; vol. 55, pp. 9-33; 2017.
Gilmore et al.; "N-Terminal Protein Modification Through a Biomimetic Transamination Reaction"; Angewandte Chemie, Bioorganic Chemistry; vol. 45, pp. 5307-5311; 2006.
Grover et al.; "Oxime Cross-Linked Injectable Hydrogels for Catheter Delivery"; Advanced Materials; vol. 25, pp. 2937-2942; 2013.
Hodgson et al.; Properties of Poly(ethylene glycol) Hydrogels Cross-Linked via Strain-Promoted Alkyne-Azide Cycloaddition (SPAAC); American Chemical Society, Bio Macromolecules; vol. 17, pp. 1093-1100; 2016.
Jha et al.; "Synthesis of Ultralarge Molecular Weight Bottlebrush Polymers Using Grubbs' Catalysts"; American Chemical Society, Macromolecules, vol. 37; pp. 4365-4374; 2004.
Johnson et al.; "Core-Clickable PEG-Branch-Azide Bivalent-Bottle-Brush Polymers by ROMP: Grafting-Through and Clicking-To"; Journal of the American Chemical Society; vol. 133, pp. 559-566; 2011.
Johnson et al.; "Drug-Loaded, Bivalent-Bottle-Brush Polymers by Graft-through ROMP"; American Chemical Society, Macromolecules; vol. 43, pp. 10326-10335; 2010.
Leda Klouda: "Thermoresponsive Hydrogels in Biomedical Applications a Seven-Year Update"; European Journal of Pharmaceutics and Biopharmaceutics; vol. 97; pp. 338-349; 2015.
Lendlein et al.; "Advanced Functional Polymers for Medicine"; Advanced Healthcare Materials; vol. 3, pp. 1939-1940; 2014; www.advhelathmat.de.
Liao et al.; "A Convergent Synthetic Platform for single-Nanoparticle Combination Cancer Therapy: Ratiometric Loading and Controlled Release of Cisplatin, Doxorubicin, and Camptothecin"; Journal of the American Chemical Society; vol. 136, pp. 5896-5899; 2014.
Lin, Chien-Chi; "Recent Advances in Crosslinking Chemistry of Biomimetic Poly(ethylene glycol) Hydrogels"; The Royal Society of Chemistry; vol. 5, pp. 39844-39853; 2015.
Mahou et al.; "Versatile Route to Synthesize Heterobifunctional Poly(ethylene glycol) of Variable Functionality for Subsequent Pegylation"; Polymers, vol. 4, pp. 561-589; 2012; www.mdpi.com/journals/polymers.
Mahou et al.; "Versatile Route to Synthesize Heterobifunctional Poly(ethylene glycol) of Variable Functionality for Subsequent Pegylation"; Polymers; vol. 4, pp. 561-589; 2012.
Marcaurelle et al.; Synthesis of Oxime-Linked Mucin Mimics Containing the Tumor-Related Tn and Sialyl Tn Antigens; Organic Letters, vol. 3, No. 23, pp. 3691-3694; 2001.
Matos-Perez et al.; "Polymer Composition and Substrate Influences on the Adhesive Bonding of a Biomimetic, Cross-Linking Polymer"; American Chemical Society; vol. 134, pp. 9498-9505; 2012.
Matyjaszewski, Krzysztof; "Atom Transfer Radical Polymerization (ATRP): Current Status and Future Perspectives"; American Chemical Society, Marcromolecules; vol. 45, pp. 4015-4039; 2012.

(56) References Cited

OTHER PUBLICATIONS

McKenzie et al.; "Direct Measurements of the Temperature, Depth and Processing Dependence of Phenyl Ring Dynamics in Polystyrene Thin Films by Beta-Detected NMR"; Royal Society of Chemistry; 2018.

Odin, George; "Principles of Polymerization"; 4th Edition; pp. 328-332; 2004.

Oz et al.; "Modular Fabrication of Polymer Brush Coated Magnetic Nanoparticles: Engineering the Interface for Targeted Cellular Imaging"; American Chemical Society, Applied Materials and Interfaces; vol. 8, pp. 19813-19826; 2016.

Pichavant et al.; "Synthesis of pH-Sensitive Particles for Local Delivery of an Antibiotic via Dispersion ROMP"; American Chemical Society; Marcromolecules, vol. 44; pp. 7879-7887; 2011.

Pichavant et al.; "Vancomycin Functionalized Nanoparticles for Bactericidal Biomaterial Surfaces"; American Chemical Society, Bio Macromolecules; vol. 17, pp. 1339-1346; 2016.

Sowers et al.; "Redox-responsive Branched-Bottlebrush Polymers for In Vivo MRI and Fluorescence Imaging"; Nature Communications; pp. 1-9; Nov. 18, 2014.

Stukel et al.; "Two-Step Synthesis of Multivalent Cancer-Targeting Constructs"; American Chemical Society, Biomacromolecules; vol. 11, No. 1; pp. 160-167; 2010.

Su et al.; "An injectable PEG-Based Hydrogel Synthesized by Strain-Promoted Alkyne-Azide Cycloaddition for Use as an Embolic Agent"; Royal Society of Chemistry; vol. 6, pp. 2904-2909; 2016.

Sugnaux et al.; "Aqueous Fabrication of pH-Gated, Polymer-Brush-Modified Alumina Hybrid Membranes"; American Chemical Society, Langmuir; vol. 29, pp. 7325-7333; 2013.

Tang et al.; "Antiviral Agents from Multivalent Presentation of Sialyl Oligosaccharides on Brush Polymers"; American Chemical Society, ACS Macro Letters; vol. 5, pp. 413-418; 2016.

Taniguchi et al.; "Functional Modification of Biodegradable Polyesters Through a Chemoselective Approach: Application to Biomaterial Surfaces"; Polymer International; vol. 55; pp. 1385-1397; 2006.

Tillet et al.; "Chemical Reactions of Polymer Crosslinking and Post-Crosslinking at Room and Medium Temperature"; Progress in Polymer Science; vol. 36; pp. 191-217; 2011.

Ulrich et al.; "Oxime Ligation: a Chemoselective Click-Type Reaction for Accessing Multifunctional Biomolecular Constructs"; ChemPubSoc, Europe; vol. 20, pp. 34-41; 2014.

Xia et al.; "EPR Study of Spin Labeled Brush Polymers in Organic Solvents"; Journal of American Chemical Society; vol. 133, pp. 19953-19959; 2011.

Xu et al.; "Bioorthogonally Crossed-Linked Hydrogel Network with Precisely Controlled Disintegration Time Over a Broad Range"; The Journal of the American Chemical Society; vol. 136, pp. 4105-4108; 2014.

Yang et al.; "Jack of all Trades: Versatile Catechol Crosslinking Mechanisms"; Royal Society of Chemistry, Chem. Soc. Rev.; vol. 43., pp. 8271-8298; 2014.

Yu, Yun et al.; "A Degradable Brush Polymer-drug Conjugate for pH-Responsive Release of Doxorubicin"; Polymer Chemistry, vol. 6; pp. 953-961; 2015.

Zou et al.; "Well-defined Diblock Brush Polymer-drug Conjugates for Sustained Delivery of Paclitaxel"; The Royal Society of Chemistry, Biomater Science; vol. 3. pp. 1078-1084; 2015.

\* cited by examiner

Scheme 1 Synthesis of macromonomers 8 and 9.

FUNCTIONAL BOTTLEBRUSH POLYMERS

CROSS-REFERENCE TO RELATED APPLICATIONS

This is a divisional of application Ser. No. 17/150,001, filed Jan. 15, 2021, which is a divisional of application Ser. No. 15/963,623, filed Apr. 26, 2018, now U.S. Pat. No. 10,894,854, which claims the benefit of priority to Application No. 62/492,388, filed May 1, 2017. The entire contents of these prior applications are incorporated by reference.

FIELD

This relates to the field of polymer chemistry and, more particularly, to functional bottlebrush polymers.

BACKGROUND

Functional polymers can be synthesized to have different useful properties through the designed placement of various organic functional groups. In recent years, ring-opening metathesis polymerization (ROMP) of has become a powerful synthetic method for preparing bottlebrush polymers, which have in turn been applied to a range of applications such as drug delivery vehicles, agents for magnetic resonance and fluorescence imaging, as well as spin labeling. Bottlebrush polymers possessing liquid crystalline behavior have also been reported.

Bottlebrush polymers are composed of a polymer chain backbone that has macromonomer brush moieties bound thereto. These brush moieties are sidechains off the polymer backbone. When drawn in three dimensions, the brush moieties resemble the bristles of a brush.

Although bottlebrush polymers have promising applications, most of the research on them focuses on the development of new synthetic methods and gaining an understanding their structure/property relationships.

BRIEF SUMMARY

Described here are new bottlebrush polymers that have improved functionality.

A first example such a bottlebrush polymer has a polymer backbone and a plurality of individual brush moieties bonded to the polymer backbone. The individual brush moieties respectively include a ketone, a hydrophilic segment, and a surface adhesive terminal group.

The ketone may be closer to the polymer backbone than the hydrophilic segment.

A second example such a bottlebrush polymer has a polymer backbone and a plurality of individual brush moieties bonded to the polymer backbone. The individual brush moieties respectively include an oxime group, a hydrophilic segment, and a surface adhesive terminal group.

The oxime group may be closer to the polymer backbone than the hydrophilic segment.

A third example such a bottlebrush polymer has a polymer backbone and a plurality of individual brush moieties bonded to the polymer backbone. The individual brush moieties respectively include a crosslinked oxyamine moiety, a hydrophilic segment, and a surface adhesive terminal group.

The crosslinked oxyamine moiety may be closer to the polymer backbone than the hydrophilic segment.

An exemplary method includes synthesizing a bottlebrush polymer having a polymer backbone and a plurality of individual brush moieties bonded to the polymer backbone, the individual bush moieties respectively including a ketone, a hydrophilic segment, and a surface adhesive terminal group. The ketone is replaced with an oxime group having a terminal azide group. Terminal azide groups of brush moieties are crosslinked using an alkyne crosslinker compound to form a crosslinked polymer.

The crosslinking step may be performed at a temperature of 30° C. to 40° C.

The crosslinking step may take places via an azide-alkyne click reaction without a metal catalyst.

The crosslinking step may be thermally initiated.

The hydrophilic segment may include polyethylene glycol.

The hydrophilic segment may include at least one polymer selected from an acrylamide, an aliphatic polyester, a glycopolymers, an acrylic acid polymer, and polyvinylpyrrolidone.

The surface adhesive terminal group may include a catechol.

The surface adhesive terminal group may include a hydroxyaryl moiety.

DETAILED DESCRIPTION OF EXAMPLE EMBODIMENTS

Figure 1:
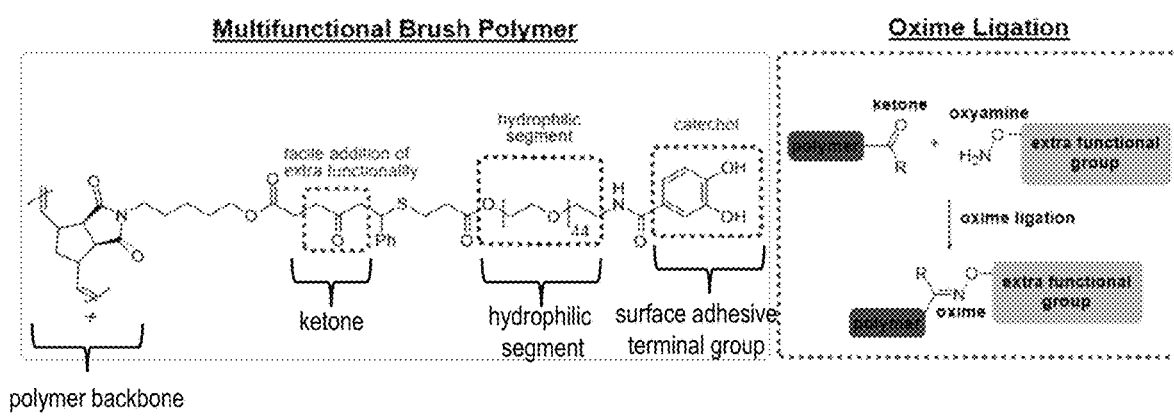
FIG. 1 illustrates aspects of an example of a bottlebrush polymer.

Referring to FIG. 1, a first example of a composition including a bottlebrush polymer is now described. The bottlebrush polymer has a polymer backbone and a plurality of individual brush moieties bonded to the polymer backbone. The individual bush moieties respectively include a ketone, a hydrophilic segment, and a surface adhesive terminal group.

The polymer backbone can take many different forms, depending on the desired characteristics of the resulting bottlebrush polymer. In certain examples, such as those described in more detail later, the polymer backbone is a polyolefin. Using polyolefins can be advantageous because they can be synthesized using a process called ring-opening metathesis polymerization or "ROMP," which is useful for preparing many types of bottlebrush polymers. It should be understood, however, that the polymer backbone is not necessarily always a polyolefin.

The individual brush moieties are bonded directly to the polymer backbone and are spaced apart along the chain of the polymer backbone. In this first example, the brush moieties are specially-designed macromonomers that are engineered to give the bottlebrush polymer desirable functionality.

One feature of these macromonomers is that they include an internal ketone group positioned between the backbone and pendant terminal end of the macromonomer. The ketone group is advantageous because it allows for bonding other molecules to the macromonomer via oxime ligation. This functionality permits post-polymerization modifications to be made to the bottlebrush polymer without needing to completely re-formulate the bottlebrush polymer.

Further toward the terminal end of the macromonomer chain is a hydrophilic segment. The hydrophilic segment is a portion of the macromonomer that is composed of a hydrophilic polymer. The hydrophilic polymer may be water soluble and/or capable of forming a hydrogel upon exposure to water. In the macromonomer, the hydrophilic segment, allows the macromonomer to solubilize in water and form a gel. The bottlebrush polymer formed from the macromonomers may also gel due to the hydrophilic segments of the individual macromonomers.

The hydrophilic segment may in certain examples be derived from polyethylene glycol (PEG) and derivatives thereof. The PEG segment may have a molecular weight ranging from about 10 to about 10,000 g/mol.

Other examples of materials that may be used for the hydrophilic segment include substantially any non-toxic hydrophilic polymers such as zwitterionic polymers, acryl amide derivatives (e.g., N-isopropylacrylamide, acryl amide), aliphatic polyesters (e.g., poly(lactic acid), poly(hydroxybutyrate)), glycopolymers (e.g., poly(2-methacrylamido glucopyranose), polyvinylpyrrolidone, anionic polymers (e.g., acrylic acid), and the like.

The surface adhesive terminal group is a functional group capable of adhering to a biological or non-biological surface. Examples of surface adhesive terminal groups include, but are not limited to, hydroxyaryl groups such as catechol, resorcinol, trihydroxyphenylalanine, and the like.

Terminal catechol groups, for example, may be used for application as biomedical adhesives. Additionally, the catechol group may undergo crosslinking upon oxidation and can be used for ion coordination which could be used to incorporate magnetic or fluorescent properties. Catechol is also chemical anchor for surface modifications.

A second example of a composition including a bottlebrush polymer also has a polymer backbone and a plurality of individual brush moieties bonded to the polymer backbone. The individual brush moieties respectively include an oxime group, a hydrophilic segment, and a surface adhesive terminal group.

The oxime group may be formed by converting the ketone of the first example to an oxime by reacting the macromonomer with an oxyamine. The oxime group allows the macromonomer to be functionalized with various oxyamines.

These oxyamines can be used to form a crosslinker bonding moiety for crosslinking different macromonomers in the bottlebrush polymer.

In a third example of a composition including a bottlebrush polymer, the individual brush moieties, respectively, include a crosslinked oxyamine moiety, a hydrophilic segment, and a surface adhesive terminal group.

The crosslinked oxyamine moiety is crosslinked between different brush moiety macromonomers. It may be in the same position along the macromonomer chain as the ketone of the first example and oxime of the second example and may be derived from the oxime of the second example by bonding an oxyamine to the ketone of the first example.

The crosslinked oxyamine moiety should be capable of crosslinking the brush moieties, thus it may be functionalized to perform this crosslinking function. One manner of crosslinking the brush moieties is via an azide/alkyne click reaction in which an azide and alkyne react to form a triazole group that joins the azide-containing and the alkyne-containing molecules together. For this reason, the oxyamine may be functionalized with a terminal azide or alkyne group prior to cross-linking.

The crosslinker molecule that bonds to the oxyamine to crosslink macromonomers may be functionalized with the other of an azide or alkyne group.

In certain examples, the crosslinker includes an azide or alkyne terminal group to facilitate the click reaction with the oxyamine bound to the brush moiety.

The interior segment of the crosslinker molecule may be a hydrophilic polymer such as at least one example selected from the possible examples of the hydrophilic segment discussed above.

Figure 2:
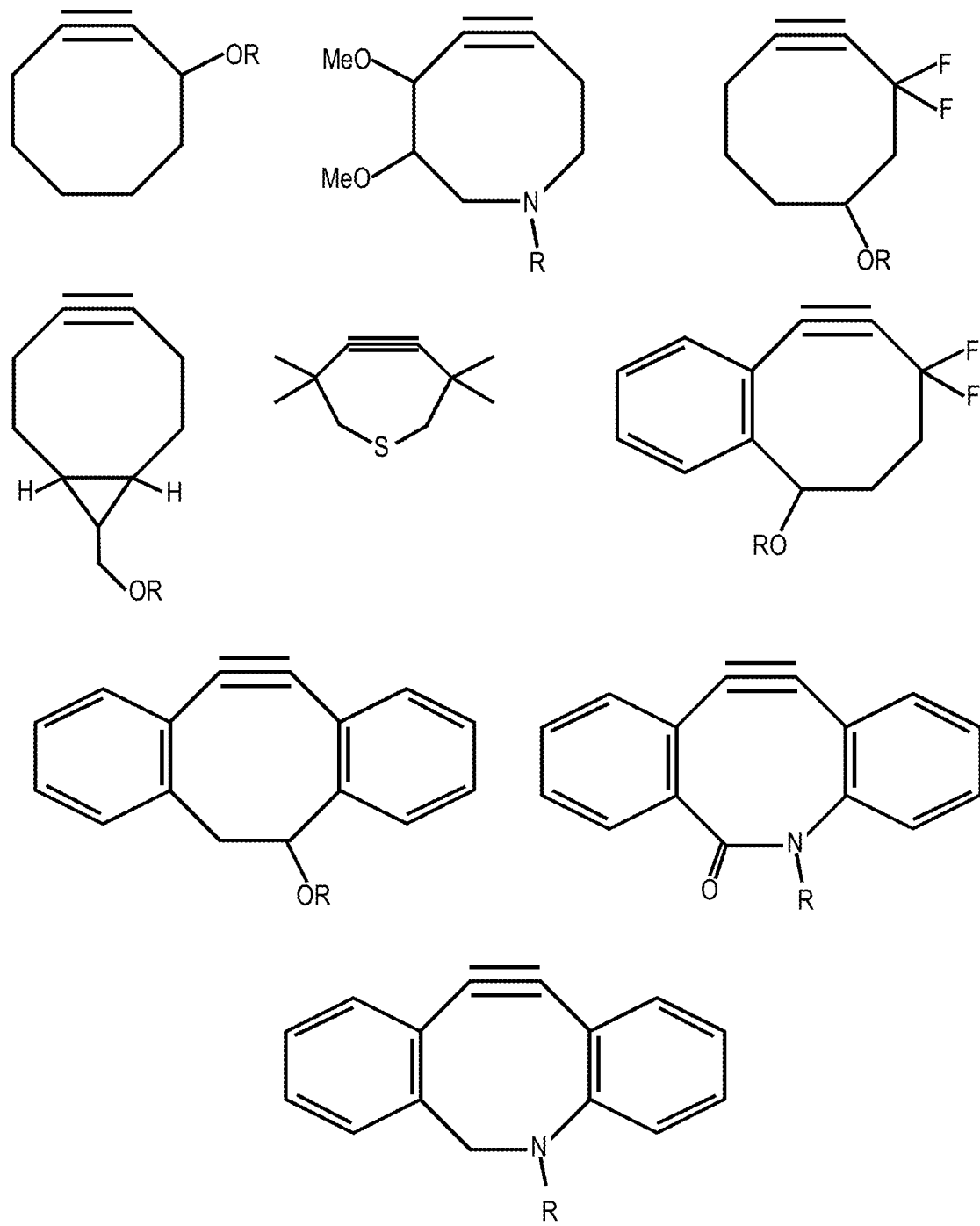
FIG. 2 is a set of examples of alkyne terminal groups that may be on the crosslinker molecule.

The terminal ends of the crosslinker molecule in certain specific examples are alkynes capable of undergoing an azide/alkyne click reaction. Examples of such alkynes include but are not limited to at least one of the alkynes in FIG. 2.

An example of a method of synthesizing the bottlebrush polymer of any of the three examples described above employs a ROMP method. In this method, the macromonomer brush moieties are first synthesized to have a cyclic terminal end opposite the a surface adhesive terminal group. This cyclic terminal group can be polymerized via ROMP using a catalyst such as a third generation Grubbs' catalyst, an example of which is shown below.

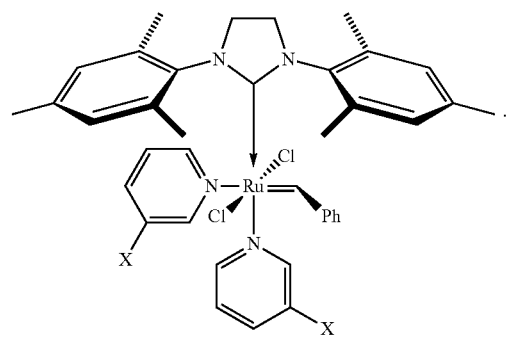

In certain examples, the cyclic terminal group includes a norbornene and may be, for example a norbornene dicarboxylic anhydride.

The macromonomer brush moieties having the ketone group may be modified by replacing the ketone group with an oxime group. This replacement may be achieved by reacting the macromonomers with an oxyamine molecule.

The oxyamine molecule may be used for crosslinking as discussed above. The crosslinking process can transform the bottlebrush polymer from a liquid to a solid or semi-solid gel over a short time such as within 15 minutes, 10 minutes, 5 minutes, 2 minutes or 1 minute of initiating the crosslinking.

Crosslinking is the process of joining together individual polymer chains via covalent bonds, ionic bonds, or physical interactions. Covalent bond crosslinking is the most common method due to the stable and irreversible nature of the covalent bond. Polymer crosslinking results in multidirectional chain extension of the parent polymer, creating a three-dimensional networked structure resulting in a substantial increase in molecular weight and fortified structural stability. Crosslinked polymers demonstrate limited polymer chain mobility, increased viscosity, and limited creep behavior within the three-dimensional framework. These properties grant crosslinked polymers with strong mechanical and thermal properties, as well as a general chemical resistance.

Crosslinking can be initiated using an external energy stimulus such as light, heat, mechanical energy, and the like. The type of external stimulus that can be used will depend on the nature of the crosslinker and the macromonomer.

In some biomedical applications, it may be advantageous to achieve crosslinking at or around a human's average normal body temperature of 37° C. or from 30° C. to 40° C. This permits the bottlebrush polymer to be applied and the crosslinking to occur in situ while contacting the human being treated. In such a case, the crosslinking is initiated by the stimulus of the person's own body temperature.

As discussed above, in certain examples the crosslinking occurs via an azide/alkyne click reaction. Such a click reaction may be conducted at 30° C. to 40° C. by combining the crosslinker with the bottlebrush polymers at the desired temperature. The heat initiates causes the crosslinking reaction. One of the advantages of using an azide/alkyne click reaction is that it can be performed without using a metal catalyst.

The bottlebrush polymers described here may be used for a wide range of applications owing to the internal ketone moiety, which allows for clean integration of small molecules and polymers into the wider polymer architecture via oxime ligation. They may be used for bioadhesives, targeted delivery of therapeutic compounds, chromophoric labeling, and/or surface modification.

EXAMPLES

The following examples are provided to illustrate certain details of specific embodiments of the compositions and methods. The scope of possible aspects, examples, and embodiments is not limited to the details described here.

Example 1

Scheme for Synthesizing Brush Moiety Compounds 8 and 9

Figure 3:
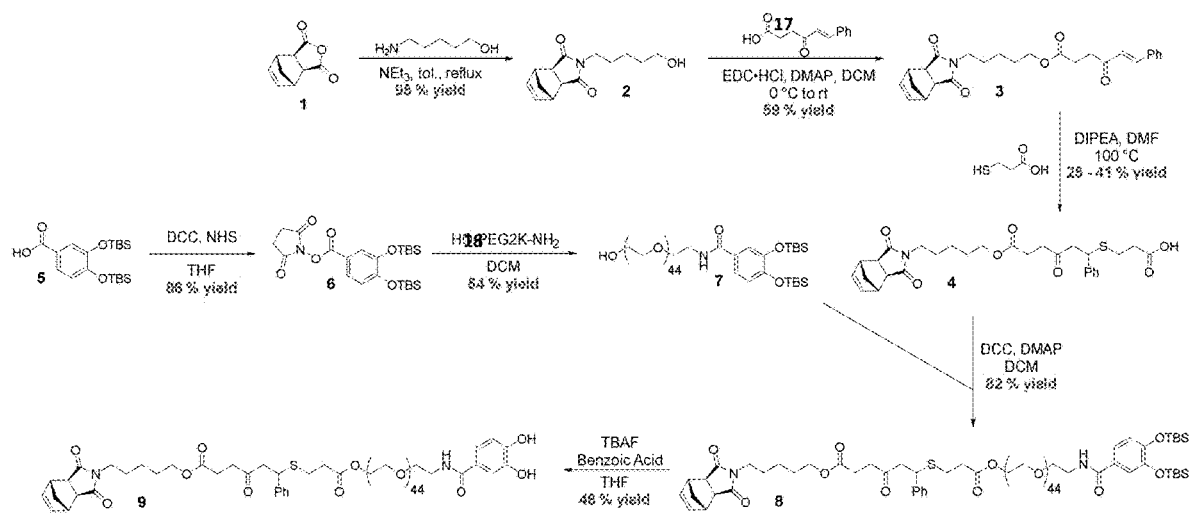
FIG. 3 is a reaction scheme for the synthesis of brush moiety compounds 8 and 9.

This Example describes the procedures used to prepare compounds 8 and 9, including synthesizing certain reactants. Scheme 1 in FIG. 3 illustrates the synthesis strategy for macromonomers 8 and 9.

The strategy toward 8 and 9 centered on the difunctionalization of ditelechelic PEG. The condensation reaction of racemic cis-5-norbornene-exo-2,3-dicarboxylic anhydride 1 with 5-amino-1-pentanol yielded 2 nearly quantitatively.

The product was then coupled with (E)-4-oxo-6-phenylhex-5-enoic acid via esterification with 1-ethyl-3-(3-dimethylamino propyl)carbodiimido hydrochloride (EDC·HCl) to give ester 3. Subsequent Michael addition served to cap the reagent with a carboxylic acid functionality, producing 4 in 25-41% yield due to the presence of a significant amount of starting material as well as a small amount of unidentified impurity.

The coupling partner for 4 was prepared beginning with known carboxylic acid 5, where the catechol functionality has been protected with silyl ethers. Coupling of 5 with N-hydroxysuccinimide, mediated by N,N'-dicyclohexylcarbodiimide (DCC), produced the NHS ester 6 in 86% yield. This reagent was then coupled selectively with monoamino PEG (54% yield), and subsequently coupled with 4 in 82% yield to generate macromonomer 8. Gel permeation chromatography (GPC) experiments of 8 revealed an average molecular weight ($M_n$) of 2,920 g/mol, which is in line with the theoretical molecular weight of 2,890 g/mol. Synthesis of desired macromonomer 9 was accomplished by deprotection of the tert-butyldimethylsilyl (TBS) groups using a combination of tetrabutylammonium fluoride and benzoic acid in 46% yield.

Synthesis of Compound 1. (3aR,4R,7S,7aS)-3a,4,7,7a-tetrahydro-4,7-methanoisobenzofuran-1,3-dione (Racemic)

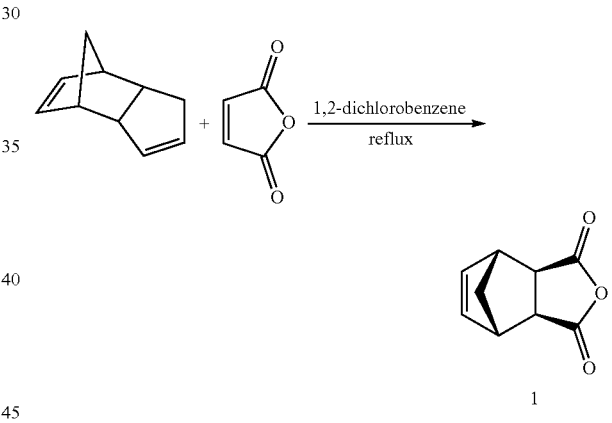

Compound 1 was prepared by the following procedure. Maleic anhydride (94.12 g, 0.96 mol) and o-dichlorobenzene (100 mL), were added to a schlenk flask fitted with a reflux condenser and the reaction was heated to reflux (200° C. bath temp.). Dicyclopentadiene (64.33 g, 0.48 mol), premelted by heating with heat gun in a separate round bottom flask, was then transferred dropwise via syringe in small portions. Using large portions and large syringe may result in dicyclopentadiene solidifying in the syringe, thus clogging the needle and complicating addition dropwise.

The reaction was then refluxed for 1.5 hr and allowed to cool to room temperature. 75 mL of cholorobenzene was then added to crystalize the product. The product did not crystalize on its own, even if left at room temperature overnight.

The product (~65:5 ratio of exo:endo mixture of isomers by 1H NMR), was then filtered and recrystallized 3 times from cholorobenzene (cryst. conditions: minimum amount of solvent at 100° C. to rt. to 0° C.) to give 29.84 g pure exo product as a white solid (19% yield). Multiple reactions on 0.12-0.48 mol scale provided yields in a range of 19-42%.

Characterization of 1: White solid: $^1$H NMR (400 MHZ, CDCl$_3$) δ 6.33 (s, 2H), 3.46 (s, 2H), 3.00 (s, 2H), 1.67 (d, 1H, J=10.3 Hz), 1.45 (d, 1H, J=10.3 Hz); $^{13}$C NMR (100 MHZ, CDCl$_3$) δ 171.7, 138.1, 48.9, 47.0, 44.2.

Synthesis of Compound 2. (3aR,4R,7S,7aS)-2-(5-hydroxypentyl)-3a,4,7,7a-tetrahydro-1H-4,7-methanoisoindole-1,3(2H)-dione

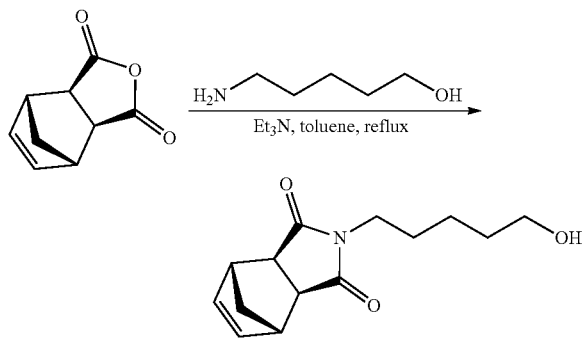

To a 500 mL round-bottom flask, were added: 1 (9.5 g, 58 mmol), toluene (200 mL), 5-amino-pentan-1-ol (6.3 g, 61 mmol) and triethylamine (0.80 mL, 5.8 mmol). The reaction was then fitted with a Dean-Stark trap and refluxed overnight, and was then concentrated using a rotary evaporator. The oil was then dissolved in ethyl acetate, washed 2 times with: 1.0 M HCl, water, brine and then dried over magnesium sulfate. Removal of solvent under reduced pressure gave 13.73 g (95% yield) of product, which was used without further purification.

Characterization of 2: Yellow oil: $^1$H NMR (400 MHZ, CDCl$_3$) δ 6.27 (t, 2H, J=2.0 Hz), 3.61 (t, 2H, J=6.5 Hz), 3.46 (t, 2H, J=7.3 Hz), 3.25 (s, 2H), 2.66 (d, 2H, J=1.3 Hz), 1.74 (broad s, 1H), 1.45-1.63 (m, 5H), 1.29-1.41 (m, 2H), 1.20 (d, 2H, J=9.8 Hz); $^{13}$C NMR (100 MHZ, CDCl$_3$) δ 178.3, 138.0, 62.7, 48.0, 45.3, 42.9, 38.7, 32.2, 27.7, 23.2; HRMS (ESI$^+$): calcd. for C$_{14}$H$_{19}$NO$_3$Na: 272.12626; found: 272.12623.

Synthesis of Compound 17.
(E)-4-oxo-6-phenylhex-5-enoic Acid (17)

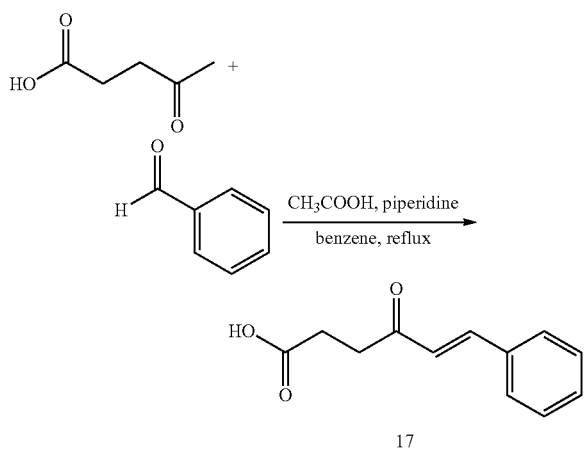

This synthetic approach was reported in the article: Bielawski, C. W.; Grubbs, R. H., Highly Efficient Ring-Opening Metathesis Polymerization (ROMP) Using New Ruthenium Catalysts Containing N-Heterocyclic Carbene Ligands. Angewandte Chemie International Edition 2000, 39 (16), 2903-2906.

Characterization of compound 17: Yellow solid: $^1$H NMR (400 MHZ, CDCl$_3$) δ 7.60 (d, 1H, J=16.3 Hz), 7.50-7.58 (m, 2H), 7.34-7.45 (m 3H), 6.76 (d, 1H, J=16.3 Hz), 3.02 (t, 2H, J=6.6 Hz), 2.75 (t, 2H, J=6.6 Hz); $^{13}$C NMR (100 MHZ, CDCl$_3$) δ 197.9, 178.6, 143.3, 134.5, 130.7, 129.1, 128.5, 125.8, 35.1, 28.1.

Synthesis of Compound 3. 5-((3aR,4R,7S,7aS)-1,3-dioxo-1,3,3a,4,7,7a-hexahydro-2H-4,7-methanoisoindol-2-yl)pentyl (E)-4-oxo-6-phenylhex-5-enoate

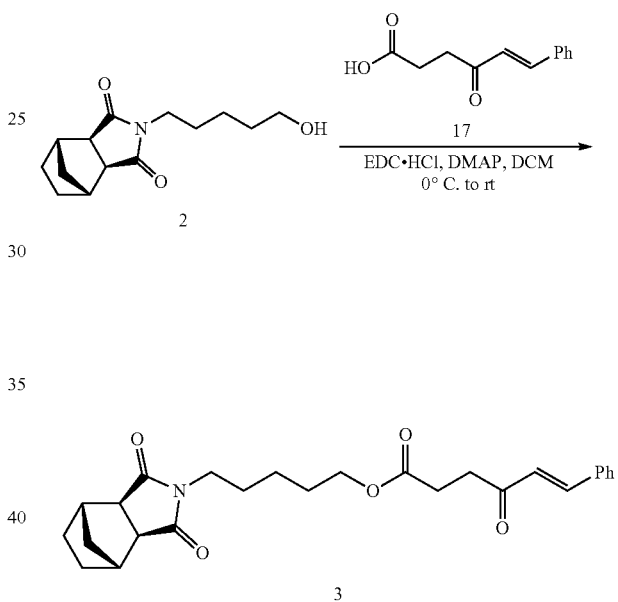

To a 0° C. solution of 2 (500 mg, 2.45 mmol) in DCM (10 mL) was added 17 (610 mg, 2.45 mmol) in DCM (10 mL), followed by DMAP (30 mg, 0.25 mmol) and EDC·HCl (470 mg, 2.45 mmol). The reaction was then stirred under N$_2$ for 1 h at 0° C. after which it was warmed to room temperature overnight. The reaction was then washed with saturated NH$_4$Cl, saturated NaHCO$_3$, water, brine, and dried under MgSO$_4$. The solvent was then removed using a rotary evaporator and the crude mixture was chromatographed using gradient elution (20% to 25% ethyl acetate/hexanes) to give 630 mg (59% yield) of compound 3.

Characterization of compound 3: Yellow oil: $^1$H NMR (400 MHZ, CDCl$_3$) δ 7.51-7.66 (m, 3H), 7.33-7.48 (m, 3H), 6.75 (d, 1H, J=16.2 Hz), 6.26 (t, 2H, J=2.0 Hz),), 4.06 (t, 2H, J=6.6 Hz), 3.45 (t, 2H, J=7.5 Hz), 3.26 (t, 2H, J=1.8 Hz), 3.00 (t, 2H, J=6.9 Hz), 2.63-2.72 (m, 4H), 1.46-1.72 (m, 5H), 1.29-1.41 (m, 2H), 1.20 (d, 1H, J=9.7 Hz). $^{13}$C NMR (100 MHZ, CDCl$_3$) δ 198.1, 178.1, 173.0, 143.0, 137.9, 134.5, 130.6, 129.0, 128.4, 126.0, 64.5, 47.9, 45.3, 42.8, 38.5, 35.4, 28.3, 28.2, 27.5, 23.5; HRMS (ESI$^+$): calcd. for C$_{26}$H$_{29}$NO$_5$Na: 459.19434; found: 458.19434.

Synthesis of Compound 4. 3-((6-((5-((3aR,4R,7S,7aS)-1,3-dioxo-1,3,3a,4,7,7a-hexahydro-2H-4,7-methanoisoindol-2-yl)pentyl)oxy)-3,6-dioxo-1-phenylhexyl)thio)propanoic Acid (4)

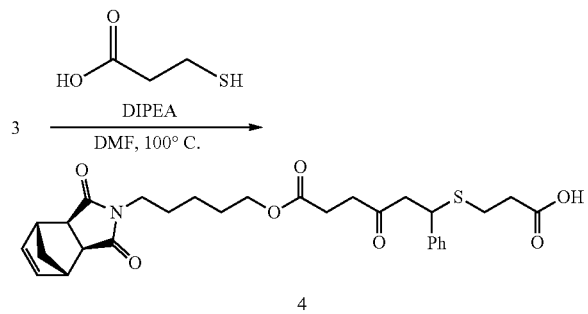

To 3 (820 mg, 1.88 mmol) in DMF (20 mL), 3-mercaptopropionic acid (0.18 mL, 2.07 mmol), and N,N-diisopolyethylamine (0.49 mL, 2.82 mmol) were added. The reaction was then heated at 100° C. for overnight and was diluted with ~200 ml of ethyl acetate, washed with 1.0 M HCl, brine, and dried with MgSO$_4$. The reaction was then concentrated and purified using column chromatography (gradient elution of 40% to 50% to 60% of ethyl acetate/hexanes) to give 400 mg of compound 4 (41% yield). Typical yields for the reaction between multiple runs varied in the range of 25-41%.

Characterization of compound 4: Yellow oil: $^1$H NMR (400 MHZ, CDCl$_3$) δ 7.18-7.40 (m, 5H), 6.28 (t, 2H, J=1.9 Hz), 4.38 (s, 1H, J=7.3 Hz), 4.02 (t, 2H, J=6.6 Hz), 3.47 (t, 2H, J=7.4 Hz), 3.27 (t, 2H, J=1.8 Hz), 2.92-3.06 (m, 2H), 2.43-2.80 (m, 10H), 1.47-1.65 (m, 5H), 1.28-1.40 (m, 2H), 1.21 (d, 1H, J=9.0 Hz); $^{13}$C NMR (100 MHZ, CDCl$_3$) δ 205.5, 178.2, 175.9, 172.6, 141.4, 137.8, 128.6, 127.6, 127.4, 64.4, 49.0, 47.8, 45.1, 44.2, 42.7, 38.4, 37.8, 34.1, 28.0, 27.8, 27.3, 26.0, 23.3; HRMS (ESI$^+$): calcd. for C$_{29}$H$_{35}$NO$_7$SNa: 564.20319; found: 564.20319.

Synthesis of Compound 5. 3,4-bis((tert-butyldimethylsilyl)oxy)benzoic Acid

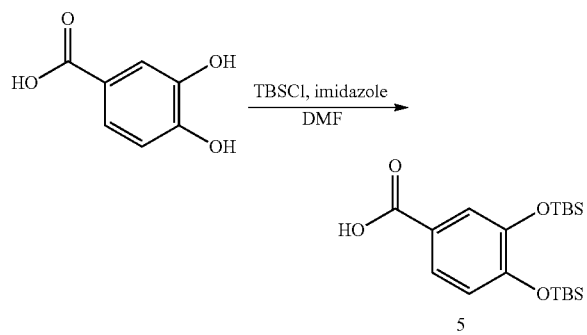

To a solution of 3,4-dihydroxybenzoic acid (3.08 g, 20 mmol) in DMF (50 mL), imidazole (6.12 g, 90 mmol) and tert-butyldimethylsilyl chloride (9.05 g, 60 mmol) were added. The reaction was then stirred for 18 hr and was poured into a mixture of Et$_2$O and 10% citric acid. 1.0 M HCl can be used as well.

The aqueous layer was extracted 3 times with Et$_2$O and the organic layer was dried using MgSO$_4$. The organic solvent was removed using a rotary evaporator and the resulting oil was dissolved in 1:1:1 mixture of MeOH:THF:H$_2$O (30 mL total volume of the mixture), and K$_2$CO$_3$ (1.38 g, 8 mmol) was added, followed by stirring for 2 h 30 min. at room temperature. The reaction was cooled to 0° C. and diluted with saturated citric acid. Aqueous layer was extracted 3 times with Et$_2$O and dried using MgSO$_4$. Organic fractions were concentrated and the crude product was purified using column chromatography (4% ethyl acetate/hexanes), to give 6.15 g (80% yield) of compound 5 as a white solid.

Characterization of compound 5: White solid: $^1$H NMR (400 MHZ, CDCl$_3$) δ 7.54-7.63 (m, 2H), 6.87 (d, 2H, J=8.3 Hz), 0.99 (2×s, 12H), 0.24 (s, 6H), 0.23 (s, 6H); $^{13}$C NMR (100 MHZ, CDCl$_3$) δ 170.4, 152.6, 146.9, 124.5, 122.9, 122.4, 120.7, 26.1, 26.0, 18.7, 18.6, -3.9, -4.0; HRMS (ESI$^+$): calcd. for C$_{19}$H$_{34}$O$_4$Si$_2$Na: 405.18933; found: 405.19061.

Synthesis of Compound 6. 2,5-dioxopyrrolidin-1-yl 3,4-bis((tert-butyldimethylsilyl)oxy)benzoate

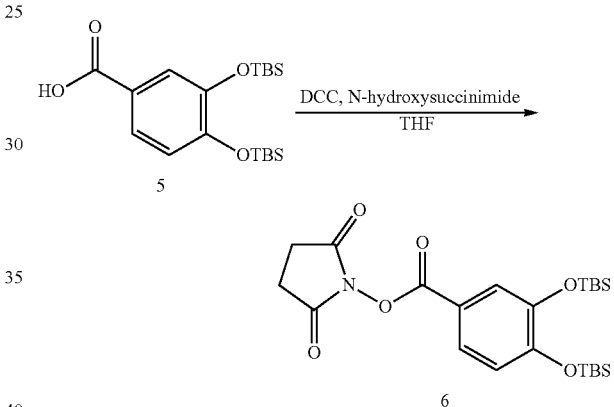

To a solution of 5 (1.91 g, 5 mmol) in THF (50 mL), N-hydroxysuccinimide (1.15 g, 10 mmol), and DCC (2.06 g, 10 mmol) were added. The reaction was then stirred at room temperature overnight and filtered on SiO$_2$ (elution with pure ethyl acetate). The organic solvent was then removed via rotary evaporator and products were purified using column chromatography (gradient elution 20% ethyl acetate/hexanes to 40% ethyl acetate/hexanes) to give 2.07 g (86% yield) of the title compound.

Characterization of compound 6: Colorless oil: $^1$H NMR (400 MHZ, CDCl$_3$) δ 7.66 (dd, 1H, J=8.4 Hz, 2.1 Hz), 7.56 (d, 1H, J=2.2 Hz), 6.89 (d, 1H, J=8.4 Hz), 2.88 (s, 4H), 0.98 (s, 18H), 0.24 (s, 6H), 0.21 (s, 6H); 13C NMR (100 MHZ, CDCl$_3$) δ 169.4, 161.4, 153.7, 147.2, 125.0, 123.0, 120.9, 117.7, 25.8, 25.8, 25.7, 18.5, 18.4, -4.1, -4.2. HRMS (ESI$^+$): calcd. for C$_{19}$H$_{37}$O$_6$Si$_2$NNa: 502.20571; found: 502.20512.

Synthesis of Compound 18. Poly(Ethylene Glycol) Monoamine, $M_n$=~2000 g/mol (18)

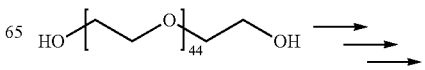

-continued

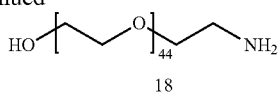

18

Poly(ethylene glycol) monoamine ($M_n$=~2000 g/mol) was prepared in 3 stages from commercial dihydroxypolyethylene glycol ($M_n$=~2000, HO-PEG2K-OH), according a previously reported analogy of $M_n$=~1450.

The procedure was as follows. To a 250 mL round-bottom flask, fitted with Dean-Stark trap, HO-PEG2K-OH (6.0 g, 3.0 mmol) and 75 mL of dry toluene were added. The Dean-stark trap was filled with dry toluene and the solution was refluxed (bath temp 140° C.), until no more water was removed from HO-PEG2K-OH). Drying was monitored by monitoring the dean-stark trap. When the toluene layer was completely transparent no more cloudiness, and no more water from toluene was observed.

The reaction was cooled to room temperature and the flask was fitted with a septa. $Ag_2O$ (1.04 g, 4.5 mmol), KI (100 mg, 0.60 mmol) and TsCl (601 mg, 3.15 mmol) were then added and the reaction was stirred at room temperature under $N_2$ overnight. The reaction was then filtered on celite (elution with DCM) and concentrated to give a white solid, which was dissolved in a minimal amount of DCM, and precipitated from ice-cold $Et_2O$ to give 5.75 g (83% yield) of monotosylated product.

5.38 g (2.33 mmol) of monotosylated product was then dissolved in 75 mL of DMF and $NaN_3$ (975 mg, 15.0 mmol) was added to the flask. The reaction was then heated at 90° C. overnight and DMF was removed using rotary evaporator. The reaction mixture was partitioned between DCM and brine (~3:1 ratio) and washed one more time with brine. The solvent was removed using rotary evaporator, dissolved in a minimal amount of DCM and precipitated from ice-cold $Et_2O$ to give 4.45 g (93% yield) of white solid (monoazide).

4.0 g (1.95 mmol) of the white solid was then dissolved in 80 mL of MeOH and 2.0 g (7.62 mmol) of triphenylphosphine was added. The reaction was refluxed overnight. Methanol was removed using rotary evaporator and the product was dissolved in small amount of DCM and precipitated from ice-cold $Et_2O$. The process was repeated until all triphenylphosphene was removed to give 2.89 g (74% yield, 57% yield over 3 steps) of HO-PEG2K-$NH_2$, which was a co-mixture with HO-PEG2K-OH. The HO-PEG2K-OH amounts varied batch by batch and the exact ratio of products was estimated using $^1H$ NMR.

Multiple iterations of reactions on 6-21 g scale produced the yields were in the range between 48-70%. The product was used as is, and any remaining HO-PEG2K-OH was removed after the next step during column chromatography.

Characterization of compound 18: White solid: $^1H$ NMR (400 MHz, $CDCl_3$) δ 3.41-3.84 (326H), 2.84 (t, 2H, J=5.0 Hz); $^{13}C$ NMR (100 MHz, $CDCl_3$) δ 73.2, 72.5, 70.5, 70.5, 70.4, 70.2, 61.6, 41.7.

Synthesis of Compound 7. Monofunctionalization of Poly(Ethylene Glycol) Monoamine ($M_n$=~2000)

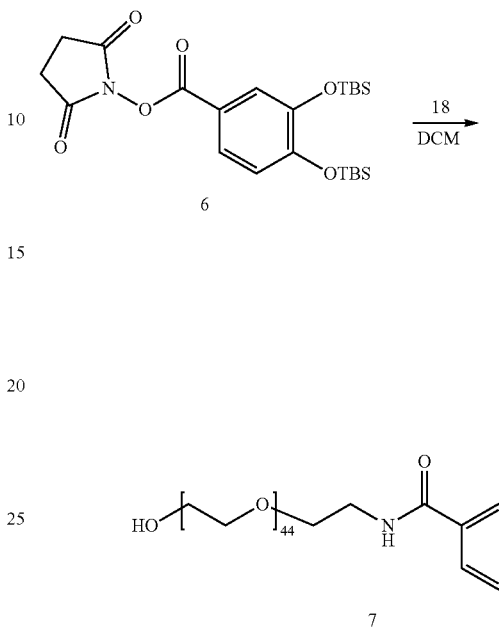

To a 250 mL round bottom flask, 18 (6.91 g, 3.46 mmol, ~55% —$NH_2$), 6 (2.00 g, 4.31 mmol) and DCM (70 mL) were added. The reaction was stirred overnight at room temperature and the solvent was removed using a rotary evaporator. The crude product was purified using column chromatography (gradient elution 3% MeOH/$CHCl_3$ to 5% MeOH/$CHCl_3$) to give 2.26 g (28% yield) of pure compound 7. The product and the HO-PEG2K-OH impurity had very similar retention time during column chromatography and both of them stained a standard $KMnO_4$ stain. Therefore, only UV-Active fractions, containing catechol moiety were collected in order not to contaminate the product with HO-PEG2K-OH.

In a separate experiment, >95% pure HO-PEG2K-$NH_2$ was obtained by dissolving HO-PEG2K-$NH_2$*HCl ($M_n$=~2000 g/mol, supplier: JenKem Technologies) in DCM (~1 g/10 mL) and washing twice with saturated $NaHCO_3$(~3 mL), water (~3 mL) and brine (~3 mL), and drying under $MgSO_4$ with subsequent removal of solvent via rotary evaporation was used. In this instance, the reaction on a 500 mg scale with 1.75 equiv. of 6 in 5 mL of DCM, provided 319 mg (54% yield) of pure product after column purification.

Characterization of compound 7: Colorless oil: $^1H$ NMR (400 MHZ, $CDCl_3$) δ 7.32 (d, 1H, J=2.3 Hz), 7.19 (dd, 1H, J=2.3 Hz, 8.3 Hz), 6.77 (d, 1H, J—8.3 Hz), 6.72 (t, 1H, J=5.2 Hz), 3.37-3.82 (m, 176H), 0.94 (s, 9H), 0.93 (s, 9H), 0.16 (s, 12H); $^{13}C$ NMR (100 MHZ, $CDCl_3$) δ 167.0, 150.1, 146.9, 128.0, 120.6, 120.5, 120.1, 70.6, 70.3, 70.3, 70.0, 61.7, 39.8, 26.0, 25.9, 18.5, 18.5, −4.0, −4.1.

Synthesis of Compound 8

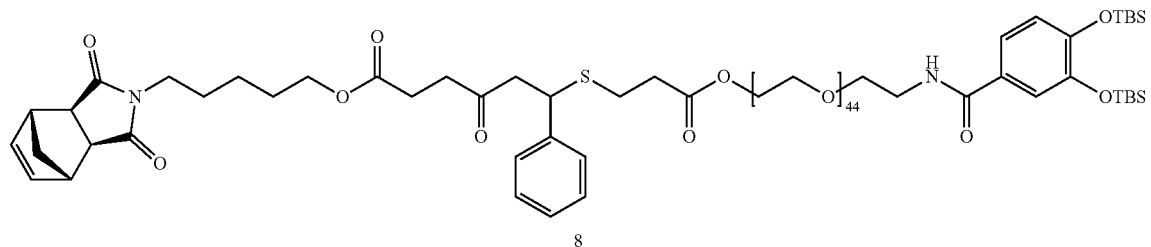

To DCM (5 mL), 7 (382 mg, 0.161 mmol), 4 (130 mg, 0.24 mmol), and DMAP (2 mg) were added. The reaction was then cooled at 0° C. and DCC (54 mg, 0.26 mmol) was then added and reaction was left to warm up and stir for overnight at room temperature. The reaction was then concentrated using rotary evaporator and purified using column chromatography (3% MeOH/CHCl$_3$ to 5% MeOH/CHCl$_3$) to give 388 mg of pure product (82% yield).

Characterization of compound 8: Colorless oil: $^1$H NMR (600 MHZ, CD$_2$Cl$_2$) δ 7.27=7.38 (m, 5H), 7.18-7.24 (m, 2H), 6.82 (d, 1H, J=8.3 Hz), 6.65 (t, 1H, J=5.6 Hz), 6.26 (s, 2H), 4.32 (t, 1H, J=7.2 Hz), 4.15 (t, 2H, J=4.8 Hz), 3.96 (d, 2H, J=6.6 Hz), 3.42-3.76 (m, 202H), 3.40 (t, 2H, J=7.4 Hz), 3.18 (s, 2H), 2.98 (dd, 2H, J=1.5 Hz, 7.4 Hz), 2.59-2.71 (m, 3H), 2.51-2.59 (m, 3H), 2.36-2.49 (m, 4H), 1.47-1.61 (m, 4H), 1.46 (dt, 1H, J=1.6 Hz, 9.8 Hz), 1.26-1.33 (m, 2H), 1.18 (d, 1H, J=9.8 Hz), 0.97 (s, 9H), 0.95 (s, 9H), 0.20 (s, 6H), 0.19 (s, 6H); $^{13}$C NMR (125 MHZ, CD$_2$Cl$_2$) δ 205.3, 177.8, 172.3, 171.5, 166.4, 149.9, 146.8, 141.8, 137.8, 128.5, 128.2, 127.7, 127.3, 120.5, 120.4, 120.1, 70.5, 70.5, 70.5, 70.3, 69.9, 69.0, 64.3, 63.8, 48.9, 47.8, 45.2, 44.0, 42.7, 39.7, 38.3, 37.7, 34.3, 28.1, 27.7, 27.3, 26.1, 25.7, 25.7, 23.3, 18.4, 18.3, −4.3, −4.4; GPC: M$_n$=2920 g/mol, PDI=1.007.

Synthesis of Compound 9

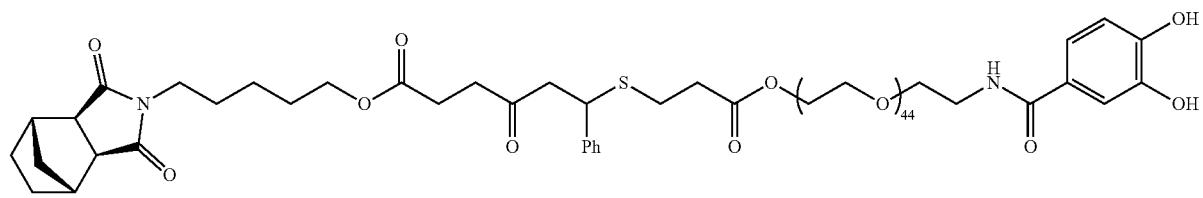

To a solution of 8 (330 mg, 0.11 mmol) in THF (11 mL), benzoic acid (54 mg, 0.44 mmol) and TBAF (0.44 mL of 1.0 M THF solution) were added. The reaction was then stirred for 30 minutes and water (0.22 mL) was added. The reaction was then diluted with small amount of 10% MeOH/CHCl$_3$ solution and filtered on a short silica pad. The solvent was then removed with rotary evaporator and the product was purified using column chromatography (3% MeOH/CHCl$_3$ to 10% MeOH/CHCl$_3$) to give 140 mg (46% yield) of deprotected product, compound 9. The product had small amount of impurity, which corresponds to the chemical shift of tetrabutylammonium ion.

Characterization of compound 9: $^1$H NMR (400 MHZ, CDCl$_3$) δ 7.14-7.41 (8H+CDCl$_3$), 6.90 (d, 1H, J=8.2 Hz), 6.28 (s, 2H), 4.35 (t, 1H, J=7.3 Hz), 4.19 (t, 2H, J=3.6 Hz), 4.0 (t, 2H, J=6.6 Hz), 3.50-3.84 (m, 175H), 3.44 (t, 2H, J=7.1 Hz), 3.26 (s, 2H+impurity), 2.98 (d, 2H, J=7.2 Hz), 2.42-2.78 (m, 10H), 1.14-1.70 (m, 8H+impurity).

Example 2

Polymerization of Compounds 8 and 9

This Example describes a procedure for polymerizing compound 8 and 9 using ROMP.

Figure 4:
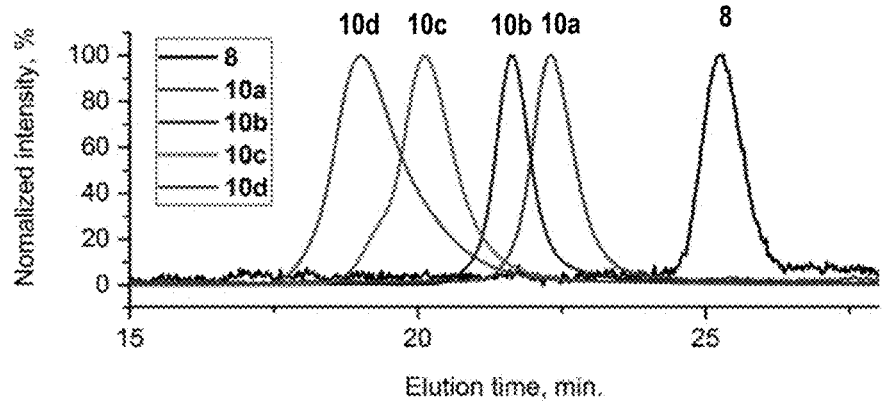
FIG. 4 is a graph of LS GPC traces for macromonomer 8 and polymers 10a-d.
Figure 5:
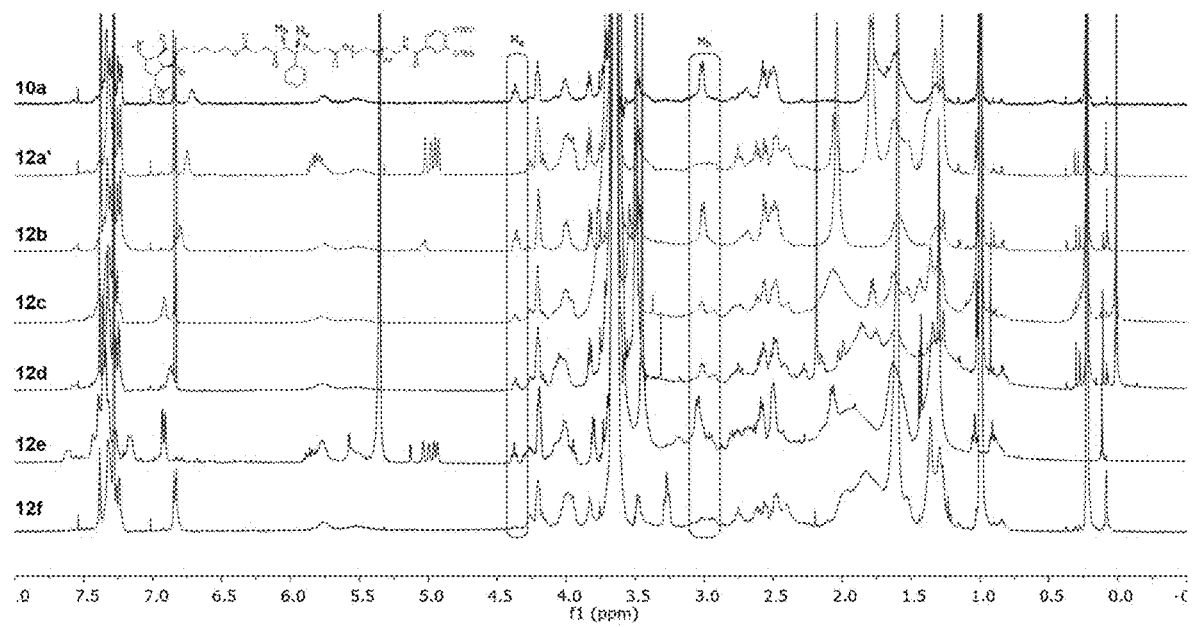
FIG. 5 is a set of $^1$H NMR spectra of the compound specified. 10a (400 MHZ, $CDCl_3$), 12a' (400 MHZ, $CDCl_3$), 12b (400 MHZ, $CDCl_3$), 12c (600 MHz, $CDCl_3$), 12d (600 MHZ, $CDCl_3$), 12e (400 MHZ, $CDCl_3$), 12f (400 MHZ, $CDCl_3$). Functionalization was monitored by disappearance of peaks at 4.35 and 3.00 ppm. Functionalization ratio was calculated by comparing the ration of Ar—H and —NH— signals at ~6.70 ppm (1 or 2H), with either vinylic protons at ~5.00 ppm (12a' and 12e), —$CH_2O$— signals at ~5.05 ppm, or the disappearance of Ha.
Figure 6:
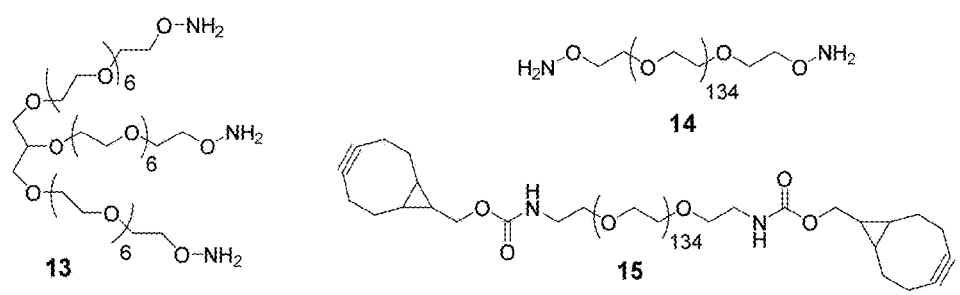
FIG. 6 is a set of examples of crosslinker molecules used to study the gelation of bottlebrush polymers 10 and 12.

With the desired macromonomers 8 and 9 in hand, the target bottlebrush polymers 10 and 11 were synthesized. Polymerization was carried out via ROMP using the third-generation Grubbs' catalyst, prepared from Grubbs' second-generation catalyst and pyridine, which is known for its utility in ROMP due to its fast initiation rate which results in typically low polydispersity. The degree of polymerization (DP) was carefully controlled by reaction stoichiometry (see Table 1 and FIG. 4). The ROMP reaction was quenched with ethyl vinyl ether.

As seen in Table 1, the average molecular weight of the obtained polymers 10 and 11 was consistently higher, though adequately in line with the theoretical $M_n$. The degree of polymerization increased consistently with increasing macromonomer concentration, from DP=22 for a 1:17 catalyst:macromonomer ratio in 10a, to a DP of 530 for a 1:500 ratio in 10d.

In all cases, $^1$H NMR analysis showed a complete disappearance of starting material 8 (t=2 h for 10a, b and t=3 days for 10c, d). Overall, ROMP demonstrated a high degree of control over a wide range of DP, with narrow molecular weight distributions represented by the polydispersity index (PDI), which was consistently below 1.15 except for 10d (DP 500). In the case of 10d, small amounts of starting material 8 were visible in the dRI GPC traces, but not the light scattering (LS) traces.

TABLE 1

Synthetic characterization data of the prepared bottlebrush polymers

| Cat:MM | R | Theo. $M_n{}^a$ | GPC $M_n{}^{a,b}$ | PDI$^d$ | DP$_{GPC}$ |
|---|---|---|---|---|---|
| 8 only | TBS | 2.890 | 2.920 | 1.01 | — |
| 1:17 (10a) | TBS | 49.10 | 63.81 | 1.10 | 22 |
| 1:50 (10b) | TBS | 144.4 | 200.7 | 1.04 | 69 |
| 1:200 (10c) | TBS | 577.7 | 795.2 | 1.14 | 272 |
| 1:500 (10d) | TBS | 1444 | 1548 | 1.46 | 530 |
| 1:17$^c$ (11) | H | 45.21 | — | — | — |

$^a$All values are ×10$^3$ g/mol.
$^b$Obtained from GPS-MALS with DMF and 0.02M LiBr as an eluant.
$^c$GPC data could not be obtained due to solubility issues.
$^d$PDI values calculated from LS GPC traces.

These results were followed by polymerizing macromonomer 9. The ROMP of 9 was also successful, showing a complete consumption of starting material by ¹H NMR, however GPC analysis of the resulting brush polymer was not possible due to poor solubility of the polymer in the DMF mobile phase.

The solubility of these brushes decreased over time, with insoluble components visible on the sides of vials and flasks. To maximize the utility of these polymers they should therefore ideally be functionalized post-polymerization before the deprotection of catechol.

A solution of 11 in DMSO-$d_6$, stored under nitrogen at −20° C. showed no signs of the formation of insoluble material after three days, so it is possible to store such a material before use.

Synthesis of Compounds 10a-d

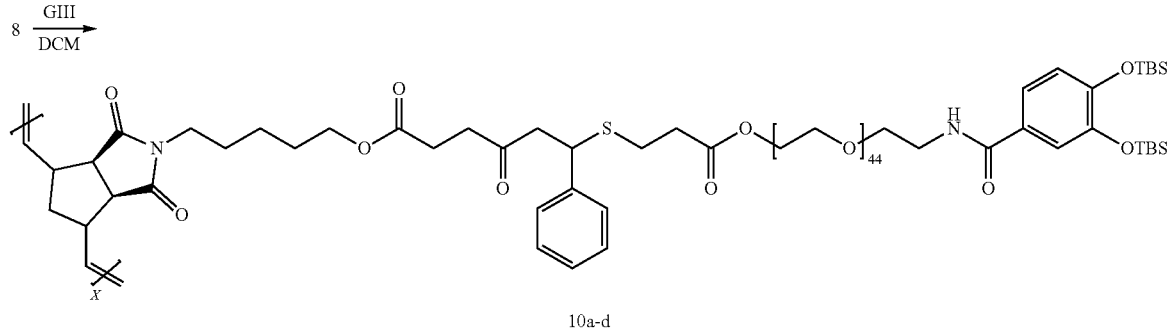

10a-d

To a scintillation vial, 8 (60 mg) in DCM (0.6 mL) and Grubbs' $3^{rd}$ generation catalyst, prepared from Grubbs' second generation catalyst, were added with 4 different ratios of catalyst:8 (1:17, 1:50, 1:200, 1:500). The molecular weight of 2888.1 g/mol, was obtained assuming starting dihydroxy PEG of 2000 g/mol, and adding end-groups, was used to do the ratio calculations.

Reactions, containing 1:7 and 1:50 catalyst:monomer were complete in 2 hrs, others were left to stir over the weekend to ensure completion. In a separate experiment, using a different batch of macromonomer, the reaction showed 100% conversion by H NMR after 4 hours, therefore the actual reaction time is not 3 days, however keeping reaction for longer reaction time is not detrimental to the reaction since average molecular weights were reasonably consistent with theoretical values.

After the designated time, 2 drops of ethyl vinyl ether were added to quench the reaction, and the solvent was removed using rotary evaporator, which resulted in quantitative recovery of crude polymer. The polymer contained no macromonomer according to ¹H NMR, however it had some reddish coloration, resulting from the catalyst. The crude polymer was then dissolved in minimal amount of DCM and precipitated from cold ether to obtain purified products.

Synthesis of Compound 11

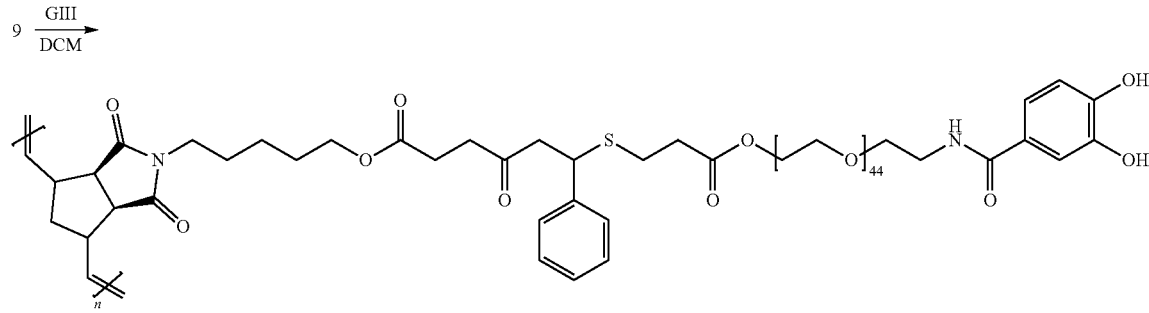

11

A procedure, analogous to the synthesis of compound 10 was used. A catalyst: 9 ratio of 1:17 was used. The reaction was performed on 53 mg scale. After precipitation of the product from ether it was additionally purified using dialysis against MeOH using MWCO:1 kD Spectra/Por 6 membrane. 36 mg (67% of product was isolated).

Example 3

Synthesis of Oxyamines

This Example describes the synthesis of certain examples of oxyamines.

Synthesis of Compounds 20a-d

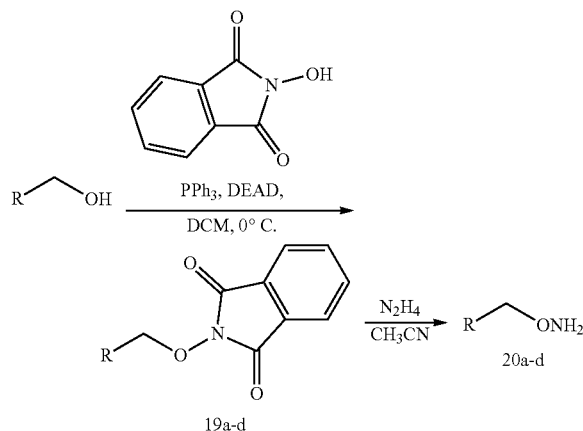

Stage 1 of the procedure was as follows. To a solution of alcohol in DCM (0.25 M), 1.5 equiv. of triphenylphosphine and N-hydroxyphthalimide were added. The mixture was cooled to 0° C. and 1.5 equivalents of diethyl azodicarboxylate (DEAD) in DCM (2.36 M) were added dropwise. The reaction was then stirred for 1 h at 0° C., and was then left overnight at room temperature. The reaction was then diluted with 40% ethyl acetate/hexanes, flushed on short silica pad and concentrated to give crude products, which were purified using column chromatography.

Stage 2 of the procedure was as follows. To a solution of 19a-d in CH$_3$CN (0.1 M), hydrazine hydrate (2.0-3.0 equiv.) was added. The reaction was then stirred for 2 h at room temperature, and after that was diluted with ~10-20 mL of DCM and filtered on celite (elution with DCM). The reaction was then concentrated and used as is (20b-d), otherwise purified by column chromatography (20a).

Synthesis of Compound 19a. 2-(dec-9-en-1-yloxy)isoindoline-1,3-dione (19a)

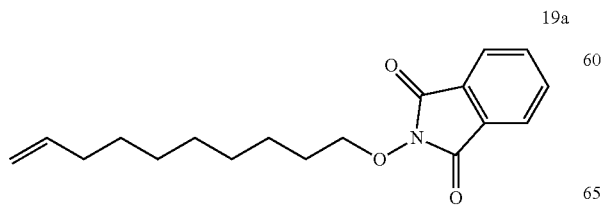

The scale was 5 mmol. The isolated mass was 1.302 g (86% yield).

Characterization of compound 19a: White solid: $^1$H NMR (400 MHz, CDCl$_3$) δ 7.80-7.87 (m, 2H), 7.70-7.77 (m, 2H), 5.74-5.90 (m, 1H), 4.98 (dd, 1H, J=1.0 Hz, 17.1 Hz), 4.92 (dd, 1H, J=1.2 Hz, 10.2 Hz), 4.2 (t, 2H, J=6.8 Hz), 2.05 (2H, q, J=6.8 Hz), 1.78 (quint., 2H, J=6.8 Hz), 1.48 (quint., 2H, J=7.0 Hz), 1.23-1.42 (m, 8H); $^{13}$C NMR (100 MHZ, CDCl$_3$) δ 163.7, 139.2, 134.4, 129.0, 123.5, 114.1, 78.6, 33.8, 29.3, 29.2, 29.0, 28.9, 28.1, 25.5; HRMS (ESI$^+$): calcd. for C$_{18}$H$_{23}$O$_3$NNa: 324.15756; found: 324.15774.

Synthesis of Compound 20a
O-(dec-9-en-1-yl)hydroxylamine

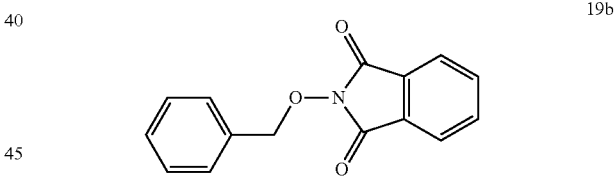

The scale was 1 mmol. The procedure employed 2.0 equivalents of N$_2$H$_4$ and purification by column (CHCl$_3$ to 0.25% MeOH/CHCl$_3$). The isolated mass: 149 mg (87% yield).

Characterization of compound 20a: Yellow, non-viscous liquid: 1H NMR (400 MHZ, CDCl$_3$) δ 5.74-5.88 (m, 1H), 4.98 (dd, 1H, J=17.2 Hz, 1.9 Hz), 4.92 (dd, J=10.2 Hz, 1.9 Hz), 3.65 (t, 2H, J=6.7 Hz), 2.03 (q, 2H, J=6.9 Hz), 1.57 (quint., 2H, J=6.8 Hz), 1.22-1.44 (10H); $^{13}$C NMR (100 MHZ, CDCl$_3$) δ 139.2, 114.1, 76.2, 33.8, 29.4, 29.4, 29.0, 28.9, 28.4, 26.0; HRMS (ESI$^+$): calcd. for C$_{10}$H$_{22}$ON: 172.17014; found: 172.17184.

Synthesis of Compound 19b.
2-(benzyloxy)isoindoline-1,3-dione

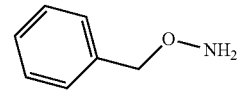

The scale was 2 mmol. The isolated mass was 290 mg (54% yield).

Characterization of compound 19b: White solid: $^1$H NMR (400 MHz, CDCl$_3$) δ 7.78-7.84 (m, 2H), 7.70-7.77 (m, 2H), 7.52-7.57 (m, 2H), 7.34-7.42 (m, 3H), 5.21 (s, 2H); $^{13}$C NMR (100 MHz, CDCl$_3$) δ 163.5, 134.4, 133.7, 129.9, 129.3, 128.9, 128.5, 123.5, 79.9; HRMS (ESI$^+$): calcd. for C$_{15}$H$_{11}$O$_3$NNa: 276.06366; found: 276.06370.

Synthesis of Compound 20b.
O-benzylhydroxylamine

The scale was 1 mmol. The procedure employed 3.0 equivalents of $N_2H_4$. The isolated mass was 69 mg (56% yield).

Characterization of compound 20b: Colorless oil: $^1$H NMR (400 MHz, $CDCl_3$) δ 7.28-7.41 (m, 5H), 5.50 (s, 2H), 4.70 (s, 2H) $^{13}$C NMR (100 MHz, $CDCl_3$) δ 137.6, 128.6, 128.5, 128.2, 78.2; HRMS (ESI$^+$): calcd. for $C_7H_{10}ON$: 124.07624; found: 124.07623.

Synthesis of Compound 19c.
2-((8-chlorooctyl)oxy)isoindoline-1,3-dione

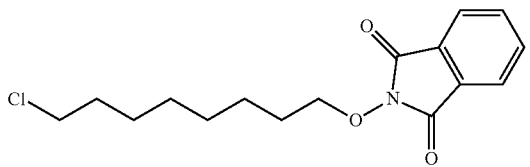

The scale was 2 mmol. The isolated mass was 553 mg (89% yield).

Characterization of compound 19c: White solid: $^1$H NMR (400 MHz, $CDCl_3$) δ 7.80-7.89 (m, 2H), 7.69-7.78 (m, 2H), 4.20 (t, 2H, J=6.7 Hz), 3.53 (t, 2H, J=6.7 Hz), 1.71-1.86 (m, 4H), 1.28-1.56 (m, 8H); $^{13}$C NMR (100 MHZ, $CDCl_3$) δ 163.8, 134.6, 129.2, 123.6, 78.7, 45.3, 32.8, 29.3, 28.9, 28.3, 26.9, 25.6; HRMS (ESI$^+$): calcd. for $C_{16}H_{20}O_3NClNa$: 332.10294; found: 332.10150.

Synthesis of Compound 20c.
O-(8-chlorooctyl)hydroxylamine

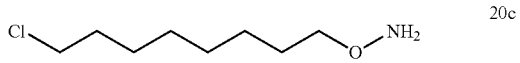 [SMILES: NOCCCCCCCCCl]

The scale was 1 mmol. The procedure used 3.0 equivalents of $N_2H_4$. The isolated mass was 151 mg (84% yield).

Characterization of compound 20c: Colorless liquid: $^1$H NMR (400 MHz, $CDCl_3$) δ 5.34 (s, 2H), 3.65 (t, 2H, J=6.6 Hz), 3.52 (t, 2H, J=6.7 Hz), 1.78 (quint., 2H, J=6.8 Hz), 1.56 (quint., 2H, J=6.8 Hz), 1.42 (quint., 2H, J=5.7 Hz), 1.23-1.37 (m, 6H); $^{13}$C NMR (100 MHZ, $CDCl_3$) δ 76.3, 45.3, 32.8, 29.4, 29.0, 28.5, 27.0, 26.1; HRMS (ESI$^+$): calcd. for $C_8H_{19}ONCl$: 180.11552; found: 180.11740.

Synthesis of Compound 19d.
2-(pent-4-yn-1-yloxy)isoindoline-1,3-dione

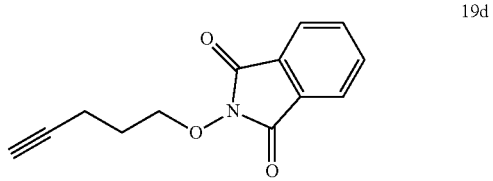 [SMILES: C#CCCCON1C(=O)c2ccccc2C1=O]

The scale was 2 mmol. The isolated mass: 400 mg (82% yield).

Characterization of compound 19d: $^1$H NMR: 7.82-7.91 (m, 2H), 7.73-7.81 (m, 2H), 4.35 (t, 2H, J=6.2 Hz), 2.53 (td, J=6.2 Hz, 2.5 Hz), 1.93-2.08 (m, 3H); $^{13}$C NMR: 158.2, 129.1, 123.6, 118.1, 77.7, 71.5, 63.7, 21.8, 9.6; HRMS (ESI$^+$): calcd. for $C_{13}H_1O_3NNa$: 252.06366; found: 252.06357.

Synthesis of Compound 20d.
O-(pent-4-yn-1-yl)hydroxylamine

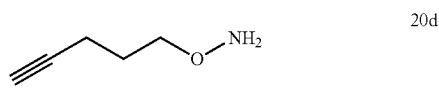

The scale was 1 mmol. The isolated mass was 51 mg (52% yield).

Characterization of compound 20d: Colorless liquid: $^1$H NMR (400 MHZ, $CDCl_3$) δ 5.37 (broad s, 2H), 3.74 (t, 2H, J=6.2 Hz), 2.26 (td, 2H, J=2.6 Hz, 7.1 Hz), 1.95 (t, J=2.6 Hz), 1.78 (quint., 2H, J=6.9 Hz); $^{13}$C NMR (100 MHZ, $CDCl_3$) δ 84.0, 74.4, 68.6, 27.4, 15.3.

Synthesis of Compound 20e.
O-(8-azidooctyl)hydroxylamine

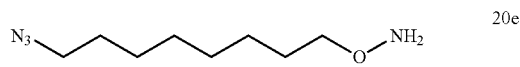

To a solution of 19c (465 mg, 1.78 mmol) in DMF (45 mL), was added sodium azide (585 mg, 9.0 mmol). The reaction was stirred at 90° C. for 24 h, after which the reaction was concentrated using rotary evaporator, then partitioned between DCM and brine and washed additional time with brine. The reaction was then concentrated and the product was dissolved in acetonitrile (18 mL), after which hydrazine hydrate (162 mg, 3.24 mmol) was added. The reaction was then stirred for 2 hr, filtered on celite, concentrated using rotary evaporator and purified using column chromatography (0.5% MeOH/$CHCl_3$) to give 321 mg (97% yield) of pure product.

Characterization of compound 20e: Colorless oil: $^1$H NMR (400 MHz, $CDCl_3$) δ 5.35 (s, 2H), 3.65 (t, 2H, J=6.6 Hz), 3.26 (t, 2H, J=3.26 Hz), 1.50-1.63 (m, 4H, includes water peak), 1.28-1.42 (m, 8H); $^{13}$C NMR (100 MHZ, $CDCl_3$) δ 76.1, 51.5, 29.3, 29.1, 28.8, 28.4, 26.6, 25.9.

Example 4

Functionalization of Polymers with Oxyamines

The oxime ligation reaction used for post-polymerization modification was investigated by coupling polymers 10a-d and 11 with 5 selected oxyamines (Table 4). Reaction progress was characterized by 1H NMR (FIG. 3) and GPC (SI) analysis. Heating the reaction at 70° C. in methanol in the presence of acetic acid resulted in moderate levels of functionalization after only 1-2 hours (12a, c, and d, Table 2). Extended reaction times resulted in greater than 95% functionalization for 12a' (16 hours) and 12f (8 hours). Functionalization with O-benzyl oxyamine (12b) resulted in a lower degree of functionalization in the same timeframe, possibly due to steric interactions with the neighboring phenyl group.

TABLE 2

Oxyamine functionalization of bottlebrush polymers 10a-d and 11.

$$10 \text{ or } 11 \xrightarrow[70^\circ \text{C., 2 h}]{\substack{\text{MeOH} \\ R^1-ONH_2}} 12$$

| Entry | S. M. | $m_{SM}{}^b$ | $m_{OX}{}^c$ | R$^1$ | R$^2$ | $m_P{}^d$ | D.F.$^e$ | Dialysis Membrane Porosity$^f$ |
|---|---|---|---|---|---|---|---|---|
| 12a$^a$ | 10a | 20 mg | 10 mg | CH$_2$=CH-(CH$_2$)$_8$- | TBS | 16 mg | 46% | MWCO 1 kD |
| 12a'$^g$ | 10a | 25 mg | 12.5 mg | CH$_2$=CH-(CH$_2$)$_8$- | TBS | 19 mg | 100% | MWCO 1 kD |
| 12b | 10b | 26 mg | 9.3 mg | PhCH$_2$- | TBS | 14 mg | 18% | MWCO 1 kD |
| 12c | 10c | 30 mg | 16 mg |  | TBS | 22 mg | 61% | MWCO 25 kD |
| 12d | 10d | 21 mg | 6 mg | HC≡C-(CH$_2$)$_3$- | TBS | 15 mg | 63% | MWCO 25 kD |
| 12e$^a$ | 11 | 26 mg | 15 mg | CH$_2$=CH-(CH$_2$)$_8$- | H | 18 mg | 43% | MWCO 1 kD |
| 12f$^h$ | 10b | 75 mg | 30 mg | N$_3$-(CH$_2$)$_{10}$- | TBS | 75 mg | 100% | MWCO 1 kD |

$^a$—reaction time = 1 h;

$^b$—mass of starting polymer;

$^c$—mass of oxyamine, added as a solution in methanol;

$^d$—mass of isolated product after dialysis;

$^e$—rough estimate of degree of functionalization, obtained from $^1$H NMR integration.

$^f$—Porosity of membrane, used for dialysis.

$^g$—reaction time = 16 h.

$^h$—reaction time = 8 h.

In principle, because the oxime ligation reaction occurs in acidic media, there is a risk of solvolysis of the ester bonds within the polymer. Fortunately, careful examination of the $^1$H NMR data does not give any indication of polymer degradation. GPC traces also show no sign of ester bond degradation, as would be apparent by an increase in retention time. According to the GPC traces of post-polymerization modified brushes (see ESI), there was an overall shift toward higher $M_n$ regions with broader PDIs for aged samples, while GPC traces taken immediately upon recovery of the polymer post-dialysis showed small or no shift at all.[25]

Functionalization of Polymers with Compounds 18a-f.

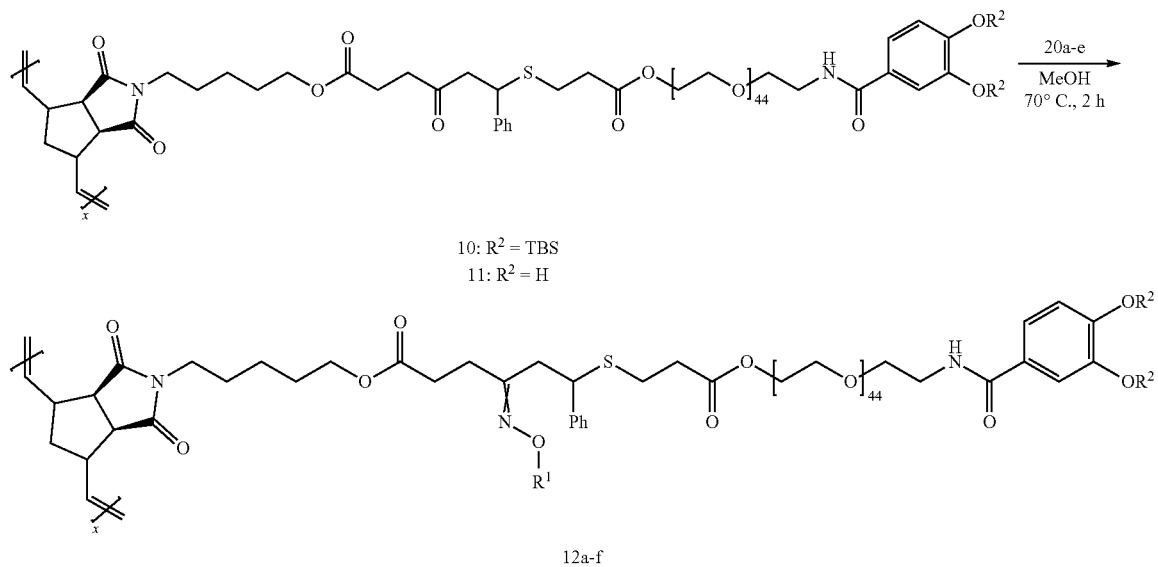

The general procedure was as follows. To starting polymers (10a-d, 11) in MeOH (20 mg/mL), solutions of oxyamines 20a-e in MeOH (~5.8 M in MeOH) were added. A small amount of acetic acid (1 drop per 20-30 mg of polymer) was then added. The vial was then sealed and heated in an oil bath at 70° C. for 2 hr, after which the solution was packed into a dialysis tube and dialyzed against MeOH with frequent change of solvent. The Solvent was then removed using rotary evaporator to give polymers 12a-f. Small samples (1-2 mg), were removed for GPC analysis.

Example 5

Crosslinking Experiments

This Example describes procedures for crosslinking polymers.

PEG-based hydrogels have been extensively studied for their applications as biomaterials. Considering the potential application they have toward biomedical areas, a polymer which is temperature-sensitive at human body temperature (37° C.) has large advantages. Ideally, a thermoresponsive hydrogel would be a liquid at room temperature, then undergo rapid gelation upon delivery. Typically, only relatively simple polymer architectures have been studied as candidates for these biomaterials, while PEG-bottlebrush thermoresponsive hydrogels are rare.

The bottlebrush polymers were tested for hydrogel applications via efficient crosslinking behavior. Herein, the reaction temperature was fixed at 37° C. to reflect normal human body temperature.

The synthetic challenge of this application was to cause efficient functionalization with the internal ketone, which is heavily hindered due to the densely grafted branches of the bottlebrush polymer. The initial efforts focused on the coupling of ketone-containing bottlebrush polymer 10 with oxyamine containing crosslinkers 13 and 14. No crosslinking was observed to occur under the conditions listed in Table 2 at either 37 or 70° C., likely due to the aforementioned hindrance of the internal ketones.

Attempts were then made to conduct crosslinking via metal-free click chemistry because this process does not require the addition of additional catalyst, nor does it yield byproducts rendering it an ideal choice for biomedical applications. In this case, hydrogel formation would be induced between the azido-functionalized polymer 12f and BCN-PEG crosslinker 15.

Figure 7:
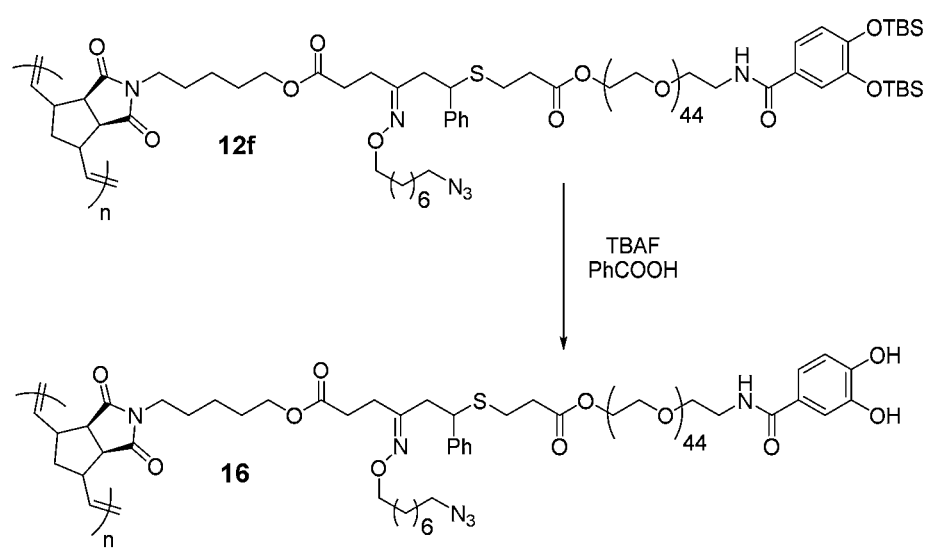
FIG. 7 is a reaction scheme for deprotecting polymer 12f to yield deprotected polymer 16.
Figure 8:
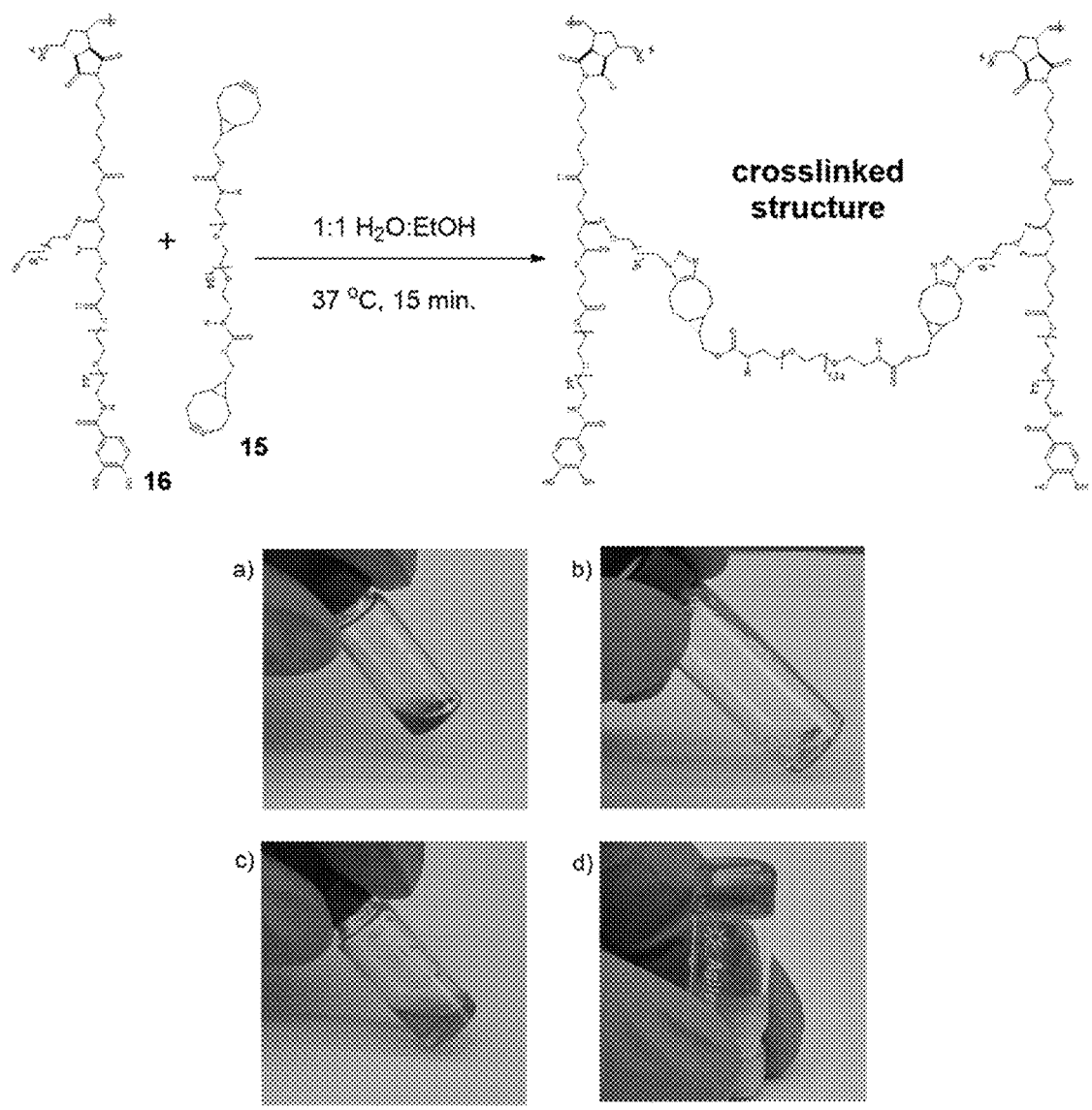
FIG. 8 (top) is a reaction scheme for crosslinking bottlebrush polymer 16 with crosslinker molecule 15. The bottom is a series of photos of a) Polymer 16 solution (200 mg/mL in 1:1 EtOH:H2O), b) crosslinker 15 solution (200 mg/ml in 1:1 EtOH:H2O), c) mixture of solutions of 15 and 16 at t=0 min, d) solution of 15 and 16 at t=15 min.

Bottlebrush polymer 16 was generated by the deprotection of 12f by tetrabutylammonium fluoride and benzoic acid (FIG. 7). The choice of these azido-containing polymers confers the additional benefit of the azido group being remotely tethered, and therefore less likely to experience the steric hindrance of the above-described ketones. Upon mixing equimolar amounts of 12f and 15 in methanol (~20 mg/ml of 12f), we observed a significant enhancement in viscosity after 16 hours. Inspired by these results, we then paired bottlebrush polymer 16 with crosslinker 15 in a more biocompatible cosolvent mixture of 1:1 ethanol:water, with polymer concentration increased to ~200 mg/mL in order to increase the reaction rate. Under these conditions a soft hydrogel formed readily, with cessation of stir bar movement in less than one minute (FIG. 8).

Synthesis of Compound 15

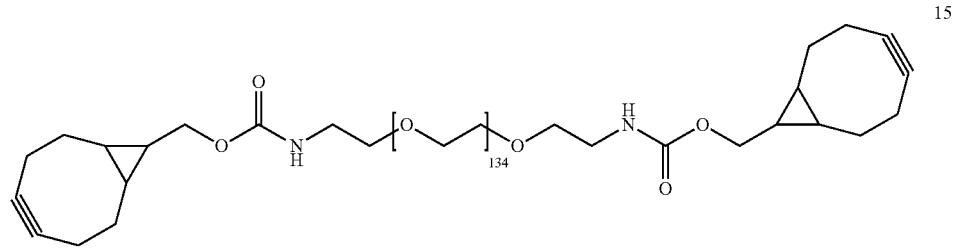

A solution of PEG6000 (3.0 g, 0.50 mmol) in DCM (20 mL), was cooled to 0° C. in an ice bath. Tosyl chloride (1.91 g, 10 mmol) was then added, followed by dropwise addition of 2.1 mL of triethylamine. Reaction was then stirred for 1 h at 0° C. under $N_2$ and then was left overnight to warm to rt. Reaction was then diluted with DCM and solution was then washed 2 times with satd. sodium bicarbonate, one time with water and brine and then was dried under $MgSO_4$.

The organic solvent was then removed and the oil obtained was dissolved in minimum amount of DCM and then precipitated into ~300 ml of ice-cold diethyl ether. A white solid was collected using vacuum filtration to give 2.69 g (85% yield) of PEG6000 ditosylate.

To a solution of PEG6000 ditosylate (2.104 g, 0.33 mmol) in DMF (25 mL), sodium azide (434 mg, 6.67 mmol) was then added. The reaction was heated at 90° C. overnight and then DMF was removed using a rotary evaporator. The resulting slurry was partitioned between brine and DCM, and washed an additional time with brine.

The Organic fraction was dried using $MgSO_4$, concentrated using rotary evaporator, dissolved in minimum amount of DCM, and precipitated in ice-cold $Et_2O$ to give 1.54 g (77% yield) of PEG6000 diazide.

To a solution of PEG6000 diazide (726 mg, 0.12 mmol) in MeOH (20 mL), $PPh_3$ (472 mg, 1.8 mmol) was added. The reaction was refluxed overnight, then cooled down to room temperature, concentrated using rotary evaporator, dissolved in minimal amount of DCM and precipitated in ice-cold $Et_2O$ to give 435 mg (60% yield) of PEG6000 diamine. To a 200 mg (0.033 mmol) solution of PEG6000 diamine, in DCM (5 mL), (1R,8S,9s)-Bicyclo[6.1.0]non-4-yn-9-ylmethyl N-succinimidyl carbonate (33.3 mg, 0.115 mmol) and triethylamine (34.9 mg, 0.345 mmol) in 1 mL of DCM were added. The reaction was then stirred for 6 hr and precipitated from ice-cold $Et_2O$. Dialysis (2 days) over MWCO1000 kD membrane then afforded 65 mg (31%) of pure 15.

Characterization of compound 15: White solid: $^1H$ NMR (400 MHZ, $CDCl_3$) δ 5.24-5.41 (broad s, 2H), 4.14 (t, 4H, J=9.1 Hz), 3.41-3.88 (m, 588H), 3.28-3.45 (broad s, 4H) 2.07-2.49 (m, 12H), 1.13-1.48 (m, 4H), 0.82-1.01 (m, 4H).

Example 6

Deprotection of Compound 12f

This Example Describes a method used to deprotect compound 12f.

Synthesis of Compound 16. To a solution of 12f (70 mg) in THF (3 mL), precooled to 0° C., benzoic acid (28 mg, 0.23 mmol) and a 1.0 M solution of TBAF in THF (0.23 mL, 0.23 mmol) were added. The reaction was then stirred for 30 min. at 0° C., followed by 1 h at rt. This reaction was then dialyzed against methanol for overnight using MWCO 1 kD membrane with frequent change of solvents. Concentration of the product using rotary evaporator then yielded 36 mg of 16.

Crosslinking Test. 36 mg of polymer 16 was dissolved in 144 μL of 1:1 EtOH: $H_2O$ in a small GC vial. To this solution, another solution of 200 mg/mL 15 (220 μL) was added. The vial was then placed in an water-bath, preheated to 37° C. and stirred for 15 minutes. Within a few minutes, stir bar movement decreased significantly and after incubation for 15 minutes, the vial contained completely soft-rubber like gel, which did not move when the vial was flipped over (see FIG. 8).

This disclosure describes certain exemplary embodiments, but not all possible embodiments of the composition and methods. Where a particular feature is disclosed in the context of a particular embodiment, that feature can also be used, to the extent possible, in combination with and/or in the context of other embodiments. The composition and methods may be embodied in many different forms. The claims should not be construed as being limited only to the embodiments described here.

That which is claimed is:

1. A composition comprising a bottlebrush polymer having an olefin polymer backbone and a plurality of individual brush moieties bonded to the polymer backbone, the individual brush moieties respectively including an oxime functional group with at least some of the brush moieties being covalently crosslinked via their respective oxime functional groups, a hydrophilic segment, and a surface adhesive terminal group.

2. The composition of claim 1, wherein the hydrophilic segment comprises polyethylene glycol.

3. The composition of claim 1, wherein the hydrophilic segment comprises at least one polymer selected from the group consisting of an acrylamide, an aliphatic polyester, a glycopolymer, an acrylic acid polymer, and polyvinylpyrrolidone.

4. The composition of claim 1, wherein the surface adhesive terminal group comprises catechol.

5. The composition of claim 1, wherein the surface adhesive terminal group comprises a hydroxyaryl moiety.

6. The composition of claim 1, wherein the individual brush moieties respectively include a crosslinked oxyamine moiety, the crosslinked oxyamine moiety being closer to the polymer backbone than the hydrophilic segment is to the polymer backbone.

7. The composition of claim 1, wherein individual brush moieties respectively include a crosslinked oxyamine moiety including a triazole.

8. A method comprising:
synthesizing a bottlebrush polymer having an olefin polymer backbone and a plurality of individual brush moieties bonded to the polymer backbone, the individual brush moieties respectively including a ketone, a hydrophilic segment, and a surface adhesive terminal group;
replacing the ketone with an oxime group having a terminal azide group; and
crosslinking terminal azide groups of brush moieties using an alkyne crosslinker compound to form a crosslinked polymer.

9. The method of claim 8, wherein the crosslinking step is performed at a temperature of 30° C.

10. The method of claim 8, wherein the crosslinking step takes places via an azide-alkyne click reaction without a metal catalyst.

11. The method of claim 8, wherein the crosslinking step is thermally initiated.

12. The method of claim 8, wherein the hydrophilic segment comprises polyethylene glycol.

13. The method of claim 8, wherein the hydrophilic segment comprises at least one polymer selected from an acrylamide, an aliphatic polyester, a glycopolymer, an acrylic acid polymer, and polyvinylpyrrolidone.

14. The method of claim 8, wherein the surface adhesive terminal group comprises catechol.

15. The method of claim 8, wherein the surface adhesive terminal group comprises a hydroxyaryl moiety.

16. The method of claim 8, wherein the ketone is closer to the polymer backbone than the hydrophilic segment is to the polymer backbone.

* * * * *